(12) United States Patent
Al Rashdan et al.

(10) Patent No.: US 11,544,916 B2
(45) Date of Patent: Jan. 3, 2023

(54) AUTOMATED GAUGE READING AND RELATED SYSTEMS, METHODS, AND DEVICES

(71) Applicant: Battelle Energy Alliance, LLC, Idaho Falls, ID (US)

(72) Inventors: Ahmad Y. Al Rashdan, Ammon, ID (US); Roger Lew, Moscow, ID (US); Michael L. Wheeler, Greenwood, IN (US); Gregory D. Lancaster, Idaho Falls, ID (US); Troy C. Unruh, Idaho Falls, ID (US)

(73) Assignees: Battelle Energy Alliance, LLC, Idaho Fall (ID); University of Idaho, Moscow, ID (US)

( * ) Notice: Subject to any disclaimer, the term of this patent is extended or adjusted under 35 U.S.C. 154(b) by 138 days.

(21) Appl. No.: 17/097,452

(22) Filed: Nov. 13, 2020

(65) Prior Publication Data

US 2021/0142102 A1    May 13, 2021

Related U.S. Application Data

(60) Provisional application No. 62/934,970, filed on Nov. 13, 2019.

(51) Int. Cl.
*G06K 9/00* (2022.01)
*G06V 10/75* (2022.01)
*G06T 3/60* (2006.01)
*G06K 7/14* (2006.01)
*G06T 7/73* (2017.01)

(Continued)

(52) U.S. Cl.
CPC ......... *G06V 10/751* (2022.01); *G06K 7/1413* (2013.01); *G06K 7/1417* (2013.01); *G06T 3/60* (2013.01); *G06T 7/74* (2017.01); *G06V 10/44* (2022.01); *G06V 10/60* (2022.01); *G06V 20/13* (2022.01); *G06T 2207/10032* (2013.01)

(58) Field of Classification Search
None
See application file for complete search history.

(56) References Cited

U.S. PATENT DOCUMENTS

2010/0214130 A1\* 8/2010 Weinmann ............. G01C 23/00
                                                                382/104
2010/0214411 A1\* 8/2010 Weinmann ............. G06F 17/00
                                                                348/148

(Continued)

*Primary Examiner* — Avinash Yentrapati
(74) *Attorney, Agent, or Firm* — TraskBritt

(57) ABSTRACT

Computing devices and methods for reading gauges are disclosed. A gauge reading method includes capturing image data corresponding to a captured image of one or more gauges, detecting one or more gauges in the captured image, cropping a detected gauge in the captured image to provide a use image including the detected gauge, and classifying the detected gauge to correlate the detected gauge with a template image. The gauge reading method also includes attempting to perform feature detection rectification on the use image to produce a rectified image of the detected gauge, performing template matching rectification on the use image to produce the rectified image responsive to a failure to perform the feature detection rectification, and estimating a gauge reading responsive to the rectified image. A computing device may implement at least a portion of a gauge reading method.

28 Claims, 9 Drawing Sheets

(51) Int. Cl.
  *G06V 10/44* (2022.01)
  *G06V 10/60* (2022.01)
  *G06V 20/13* (2022.01)

(56) References Cited

U.S. PATENT DOCUMENTS

| | | | |
|---|---|---|---|
| 2014/0347482 A1* | 11/2014 | Weinmann | B64D 45/00 348/144 |
| 2017/0169593 A1* | 6/2017 | Leigh | G06T 11/60 |
| 2021/0142102 A1* | 5/2021 | Al Rashdan | G06T 3/60 |
| 2022/0245848 A1* | 8/2022 | Spears | G06T 7/0016 |

* cited by examiner

AUTOMATED GAUGE READING AND RELATED SYSTEMS, METHODS, AND DEVICES

CROSS-REFERENCE TO RELATED APPLICATIONS

This application claims the benefit of U.S. Provisional Patent Application Ser. No. 62/934,970, filed Nov. 13, 2019, pending, titled "Automated Gauge Reading to Reduce Operation and Maintenance Activities in Nuclear Power Plants," the entire disclosure of which is hereby incorporated herein by this reference.

STATEMENT REGARDING FEDERALLY SPONSORED RESEARCH OR DEVELOPMENT

This invention was made with government support under Contract Number DE -AC07-06ID14517 awarded by the United States Department of Energy. The government has certain rights in the invention.

TECHNICAL FIELD

This disclosure relates generally to automatic gauge reading, and more specifically to automatic gauge reading to reduce operation and maintenance activities in nuclear power plants.

BACKGROUND

The nuclear industry is a cornerstone of the United States (U.S.) electrical strategy, providing nearly one-fifth of the power generation in the country. Many of the plants that make up the current nuclear fleet are already nearing forty years in service, and have filed for or acquired extensions to increase their operations for another twenty years. As nuclear plants of the 1960s and 1970s meet modem technology and business demands, there will be modernization requirements to ensure that the nuclear industry continues profitable operations and becomes competitive in a global market while continuing to sustain safe operations.

As information technology evolves, the nuclear industry is moving from analog to digital meters. However, the implementation of digital meters is progressing slowly, and the popular pointer gauge is still widely in use due to its reliability, low price, and simple structure. Additionally, not all digital measurement instruments have computer interfaces. Non-digital output from the analog and digital instruments may therefore be manually observed and recorded by human technicians, which may be costly, slow, and prone to errors.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
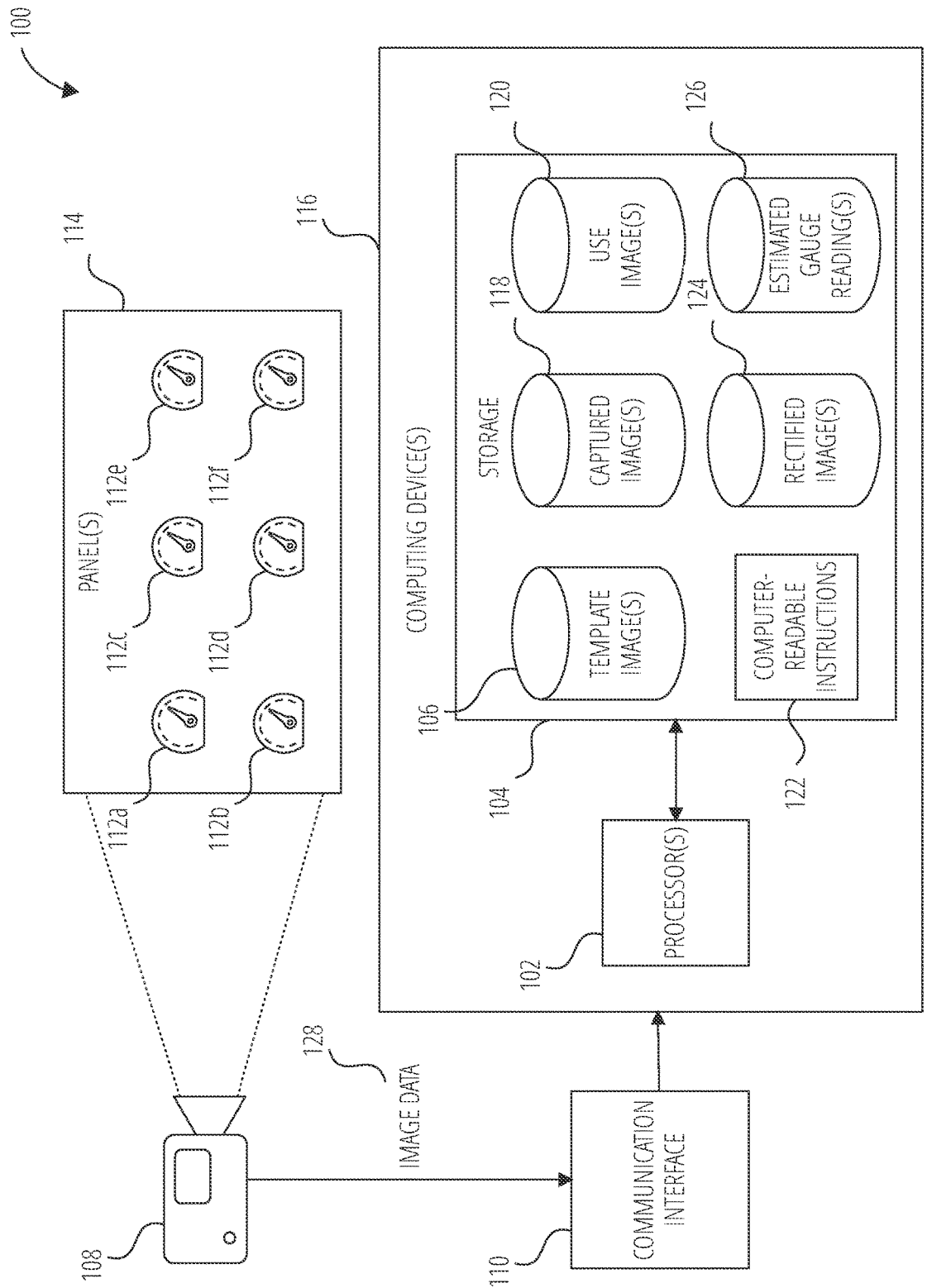
FIG. 1 is a block diagram of a gauge reading system, according to some embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Nuclear power plants are extremely diverse facilities, often including thousands of instruments. Analog dial gauges, which may include glass fronts and a pointer arm, may be used in the operation of these nuclear power plants. Currently, routine monitoring and maintenance tasks require manual checking and recording of analog instrumentation and control (I&C) components that are not digitized. Administrators of some nuclear power plants may find it valuable to begin a long-term process of converting these analog gauges to digital components that communicate readings to a central computing unit, but a need exists for more immediate automation technology to streamline the gauge reading process.

Manually reading and recording analog measurements may be prone to errors. For critical operations, this may involve labor-consuming peer checking. One aspect of upcoming modernization needs is the plant-wide automation of gauge reading. Disclosed herein is the use of imaging characteristics and technologies that may be combined with computer vision to perform an automated reading of the gauges and report values to a central computing system, which records the values to a database.

Common difficulties that nuclear power plants pose for gauge reading technologies include: the presence of many gauges along a control room or panel, each of which requires reading; the need for an image capture device of an automated gauge reader to face the gauge to process the image; and the lack of an integration pathway for technologies in the nuclear industry. Installing a camera for each gauge would likely be both cost prohibitive and unrealistic in terms of space management.

A large portion of labor activities performed by human technicians in nuclear power plants can be automated by replacing inspections (e.g., visual inspections, physical inspections) and other monitoring activities with image processing technology. Disclosed herein is image processing technology that may enable automation of gauge reading in nuclear power plants. For example a single image capture device may be used to read multiple gauges at a range of positions and angles.

Embodiments disclosed herein may enable capture of multiple readings from multiple different gauges simultaneously, which is helpful because many plant panels have somewhere between ten and thirty gauges in one panel. Instead of recording every gauge reading manually in a log sheet, one picture may be taken using a mobile device camera, a tablet camera, a fixed camera, or a dedicated camera. Drones equipped with cameras may also be used to capture gauge readings in remote locations. 360-degree cameras may be used to capture readings from at least substantially all gauges in a control room. This may be more time and cost economical than installing a camera that is equipped with optical character recognition on top of each individual gauge when thousands of gauges exist in a plant. Also, installing a dedicated camera on top of a gauge is sometimes not possible due to space constraints, lack of an adjacent power source, or lack of a wireless network with which to transmit the measurement from the gauge. Gauge reading technology disclosed herein may be used with a 360-degree camera, or several fixed cameras, in a control room to capture substantially all the readings, which replaces the need for operators logging data periodically.

It may be relatively simple to read a gauge value from an image that is taken from a perspective that is perpendicular to the gauge, assuming that the gauge may be clearly seen in the image. It may be more difficult, however, to read a gauge value from an image that is taken at an oblique angle from a face of the gauge, or if the gauge is not clearly seen in the image (e.g., the gauge is in shadow or water damage obscures known features of the gauge). Where an image of a gauge is taken from an oblique angle, the image may be transformed (e.g., using Photoshop Free Transform tool) to essentially "stretch" the image in a linear process based on the selected area within the image. For example, the image may be manually and iteratively transformed by a user to the point where a gauge in an image taken at an oblique angle appears to be circular for a circular gauge, or rectangular for a rectangular gauge. This process may also be performed using a two-dimensional (2-D) transformation tool like MATLAB "affine2d." A 2-D affine transform would be a good process to apply to gauges installed on a flat panel because the entire oblique section of the image appears as a plane surface that may be effectively transformed in a single process. Processes like this may also be used to adjust satellite images taken at non-nadir (not straight down) conditions to geometrically correct images to match ground maps. Also, a shape-based affine transform algorithm may be used in a traffic sign recognition system to rectify the shapes of traffic signs captured at oblique angles and increase the accuracy of traffic detection.

The ability to read and transform an analog value into a digital signal may be enabled using a combination of standard computer vision techniques to obtain an instrument reading from an image of its display that shows electrical quantities like voltage, current, power, and impedance. Process operations for the recognition of digital and analog instrument displays may involve image capture and display delimitation. For digital instrumentation, the user may select, either automatically or manually, the region of interest in an image and create a smaller picture that allows the limits of the image and its value to be recognized. For analog instrumentation, the angle of the edge of the needle may be detected, and algebraic relationships are applied to associate the needle pointer with the value. The recognition and association process for digital displays may be performed with relatively high accuracy. However, results for analog display reading vary greatly depending on the camera technology, since imperfections can be caused by camera limitations. An analog instrument may include three parts: a pointer, a scale, and a lettering element. A pointer has a symmetric shape with an easily detectable medial axis such as a triangle, a rectangle, or a combination of both. The scale of the rotating pointer has the shape of the circle, or a circular arc, and there is a relationship between angle and displayed value. The lettering element may contain writing such as unit information, company name, firm's logo, and maker's emblem.

Circular scales may be detected by using circular arc detection methods extended to circle detection by using gradients. Such transformation algorithms may be used to detect circles and shapes. Also, image preprocessing may be used to improve image quality and reduce noise, enabling identification of the gauge pointer, detection of scale marks, and automatic recognition of the pointer gauge value. Essential elements of image preprocessing may include contrast, geometric adjustments, and filtering. A system may be used to detect multiple round gauges. This system may use a circular transformation (e.g., in MATLAB) to identify gauge edges and locate the gauge needle using the X-Y coordinates of the midpoint of the circle detected and the circle's radius. The overall success of the system may be limited by inherent difficulties with transform-based systems. Differences in the camera location and field of view result in changes in the gauge diameter, which can be problematic for consistent detection. Also, because the transform relies on detecting shapes such as circular shapes, variations in the angle of the camera can create an elliptical outline of the circular gauge that cannot be accurately identified. The same applies to rectangular gauges, which may appear trapezoidal rather than rectangular from some camera angles. It will be understood that although much of the disclosure specifically discusses circular gauges, embodiments disclosed herein may be extended to rectangular gauges, or even other-shaped gauges.

It would be helpful to automatically read gauges at oblique angles to be able to apply the technology in a nuclear power plant. Although various embodiments herein are discussed with respect to reading of gauges in nuclear power plants, it will be apparent to those of ordinary skill in the art that embodiments disclosed herein apply also to any other environment where automatic reading of gauges would be helpful or desirable. In images acquired in nuclear power plants the camera may not directly face a gauge for the identified applications. Conventional automatic gauge reading systems and methods are not able to automatically estimate gauge readings in images acquired at an oblique angle to the gauges. Embodiments disclosed herein enable automatic gauge reading of gauges (e.g., one gauge or many gauges) illustrated in an image even where the image is taken at an oblique angle to one or more of the gauges in the image. Embodiments disclosed herein identify the gauge from the surrounding environment and quantify the position and orientation of the gauge in space to identify and rectify its orientation. Embodiments disclosed herein then identify the dial to determine the reading of the gauge.

In some embodiments an image processing technology is configured to automate the alignment process (i.e., self-determine the angles) for a gauge to enable wider application of gauge reading image processing methods, and ultimately augment, or replace, the tedious and error prone process of manually logging gauge readings in a nuclear facility. Embodiments disclosed herein may measure and log a single gauge or simultaneously measure and log the values of multiple gauges, using either a fixed or a mobile camera.

Embodiments disclosed herein are capable of identifying gauges in an image, determining positions of the gauges, and determining orientations of the gauges in space. The orientation may be determined using feature detection when possible, or using template-matching when feature detection fails. Images may be classified into specific types.

A method of reading a gauge may include capturing an image including the gauge, identifying the gauge from the surrounding environment, quantifying a position of the gauge in space, quantifying an orientation of the gauge in space, rectifying the orientation of the gauge, identifying a dial of the rectified gauge, and taking a reading of the dial responsive to an identified position and/or orientation of the dial relative to the rectified gauge.

In some embodiments a computing device includes one or more processors and one or more data storage devices. The one or more processors include one or more template images of one or more template gauges stored thereon. The one or more data storage devices further include computer-readable instructions stored thereon. The computer-readable instructions are configured to instruct the one or more processors to classify a detected gauge in a use image to correlate the detected gauge with one of the one or more template images, attempt to perform feature detection on the use image based on the correlated one of the one or more template images to transform the use image into a rectified image, perform template matching rectification on the use image to produce the rectified image responsive to a failure to perform the feature detection, and estimate a gauge reading of the detected gauge responsive to the rectified image.

In some embodiments a gauge reading method includes capturing image data corresponding to a captured image of one or more gauges, detecting one or more gauges in the captured image, cropping a detected gauge in the captured image to provide a use image including the detected gauge, and classifying the detected gauge to correlate the detected gauge with a template image. The gauge reading method also includes attempting to perform feature detection rectification on the use image to produce a rectified image of the detected gauge, performing template matching rectification on the use image to produce the rectified image responsive to a failure to perform the feature detection rectification, and estimating a gauge reading responsive to the rectified image.

In some embodiments a gauge reading method includes detecting a quick response (QR) code in a use image illustrating a gauge and the QR code with the QR parallel with a face of the gauge, detecting corner points of the QR code, generating a transformation matrix for rectifying the use image based on the detected corner points of the QR code, and transforming the use image responsive to the transformation matrix to provide a transformed image. The gauge reading method also includes detecting one or more circles in the transformed image, matching a template gauge image to each of the one or more detected circles, and providing a rectified image including a matched one of the one or more detected circles.

FIG. 1 is a block diagram of a gauge reading system 100, according to some embodiments. The gauge reading system 100 includes one or more computing devices 116, a communication interface 110, one or more image sensors 108, and one or more panels 114 including one or more gauges 112a-112f. By way of non-limiting example, the one or more panels 114 may be one or more panels of a control room of a nuclear power plant. Many panels of nuclear power plants may include between substantially ten gauges and thirty gauges in a single panel. It will be understood, however, that the gauge reading system 100 may be used to read any gauges in any environment. Also by way of non-limiting example, the one or more gauges 112a-112f may include substantially circular gauges such as analog dial gauges, which may include glass fronts and pointer arms. As a further, non-limiting example, the one or more gauges 112a-112f may include gauges having shapes different from circular, such as rectangular.

The one or more image sensors 108 may include one or more cameras. By way of non-limiting examples, the one or more cameras may include a panoramic camera, a surveillance camera, a still camera, a video camera, other cameras, or combinations thereof. The one or more image sensors 108 are configured to generate image data 128 corresponding to one or more captured images 118 responsive to waves (e.g., optical waves) received at the one or more image sensors 108. By way of non-limiting example, the one or more image sensors 108 may be configured to capture image data 128 corresponding to one or more captured images 118 of the one or more panels 114. The one or more captured images 118 may be taken by the one or more image sensors 108 from any of a variety of positions and any of a variety of angles (e.g., oblique angles) to the one or more gauges 112a-112f. By way of non-limiting example, the one or more image sensors 108 may be mounted at one or more locations in a control room of a nuclear power plant. Also by way of non-limiting example, the one or more image sensors 108 may be secured to a drone (e.g., a flying drone, a drone on wheels, a walking drone, etc.) configured to move relative to the one or more panels 114 to capture the image data 128 from a variety of different locations and angles. The one or more image sensors 108 are configured to provide the image data 128 to the communication interface 110.

The communication interface 110 is configured to relay the image data 128 from the one or more image sensors 108 to the one or more computing devices 116 for further processing. The communication interface 110 may include any interface capable of carrying electronic data from one device to another. By way of non-limiting examples, the communication interface 110 may include a network of wires, a wireless communication link (e.g., WiFi, Bluetooth, Zigbee, a wireless cellular data network, other wireless networks, or combinations thereof), a portable data storage medium (e.g., a portable Flash drive, a memory card, etc.), an optical communication system, other communication interface, or combinations thereof.

The one or more computing devices 116 are configured to receive the image data 128 and process the image data 128 to take measurements of the one or more gauges 112a-112f of the one or more panels 114. The one or more computing devices 116 include one or more processors 102 operably coupled to one or more data storage devices 104. The one or more processors 102 may include a central processing unit (CPU), a microcontroller, a field programmable gate array (FPGA), a programmable logic controller (PLC), other programmable device, or combinations thereof. The one or more data storage devices 104 may include one or more volatile data storage devices (e.g., random access memory (RAM)), one or more non-volatile data storage devices (e.g., a hard drive, Flash memory, etc.), or combinations thereof. The one or more computing devices 116 is configured to store the one or more captured images 118 responsive to the image data 128 received from the one or more image sensors 108 via the communication interface 110.

The one or more data storage devices 104 may also include one or more template images 106 of one or more template gauges stored thereon. The one or more template images 106 may be images of templates of the one or more gauges 112a-112f of the one or more panels 114. In some embodiments the one or more template images 106 may include one or more template images of backgrounds of the one or more template gauges, and one or more template images of dials of the one or more template gauges. The one or more processors 102 may use the one or more template images 106 to identify and read the one or more gauges 112a-112f in the one or more captured images 118.

The one or more data storage devices 104 may also include computer-readable instructions 122 stored thereon.

The computer-readable instructions 122 are configured to instruct the one or more processors 102 to perform operations according to embodiments disclosed herein. By way of non-limiting examples, the computer-readable instructions 122 may be configured to instruct the one or more processors 102 to perform at least a portion of a gauge reading method 200 of FIG. 2, a feature detection processing flow 300 of FIG. 3, a template matching rectification processing flow 400 of FIG. 4, a gauge angle estimation processing flow 800 of FIG. 8, a dial angle estimation processing flow 900 of FIG. 9, a gauge detection processing flow 1000 of FIG. 10, a QR code rectification processing flow 1100 of FIG. 11, or combinations thereof.

The computer-readable instructions 122 are configured to instruct the one or more processors 102 to detect the one or more gauges 112a-112f in a captured image of the one or more captured images 118. The computer-readable instructions 122 are further configured to instruct the one or more processors 102 to detect a plurality of the one or more gauges 112a-112f in the captured image and provide a plurality of sub-images, each of the plurality of sub-images including one of the detected plurality of gauges. The plurality of sub-images may be stored as one or more use images 120 by the one or more data storage devices 104. In some embodiments the computer-readable instructions 122 are configured to instruct the one or more processors 102 to detect the plurality of the one or more gauges 112a-112f by detecting substantially rounded regions of lightness surrounded by darkness in the captured image. In some embodiments the computer-readable instructions 122 are configured to instruct the one or more processors 102 to detect the plurality of the one or more gauges 112a-112f by applying one or more binary thresholds to pixels of the captured image to generate a binary image.

The computer-readable instructions 122 are also configured to instruct the one or more processors 102 to classify a detected gauge in one of the one or more use images 120 to correlate the detected gauge with one of the one or more template images 106. The computer-readable instructions 122 are further configured to instruct the one or more processors 102 to attempt to perform feature detection on one of the one or more use images 120 based on the correlated one of the one or more template images 106 to transform the use image into a rectified image. One or more rectified images 124 may be stored by the one or more data storage devices 104.

The computer-readable instructions 122 are further configured to instruct the one or more processors 102 to perform template matching rectification to produce the rectified image responsive to a failure to perform the feature detection. Feature detection may be a more accurate way to rectify a use image than template matching. As a result, the one or more computing devices 116 may default to using feature detection, and resort to template matching if the feature detection fails. The computer-readable instructions 122 may be configured to instruct the one or more processors 102 to perform the template matching rectification by blurring the use image and generating binary threshold images based on the blurred use image. The computer-readable instructions 122 may be further configured to detect contours in the binary threshold images, fit ellipses to the detected contours, and determine a homology estimation to rectify the use image based on the fit of the ellipses to the detected contours. In embodiments where the one or more gauges 112a-112f include a rectangular gauge, the computer-readable instructions 122 may be configured to detect contours corresponding to trapezoidal shapes, fit trapezoids to the detected contours, and determine a homology estimation to rectify the use image based on the fit of the trapezoids to the detected contours.

The computer-readable instructions 122 are configured to instruct the one or more processors 102 to estimate a gauge reading of the detected gauge responsive to the rectified image. In some embodiments the computer-readable instructions 122 are configured to instruct the one or more processors 102 to estimate the gauge reading by estimating a gauge angle of the detected gauge in the rectified image relative to a template angle of a template gauge in the correlated one of the one or more template images 106. In some embodiments the computer-readable instructions 122 are configured to instruct the one or more processors 102 to estimate the gauge reading by estimating a dial angle of a dial of the detected gauge in the rectified image relative to the detected gauge in the rectified image.

In some embodiments the one or more data storage devices 104 may also be configured to store one or more estimated gauge readings 126. The one or more estimated gauge readings may be obtained using a gauge reading method 200, which will be discussed in more detail with respect to FIG. 2.

Figure 2:
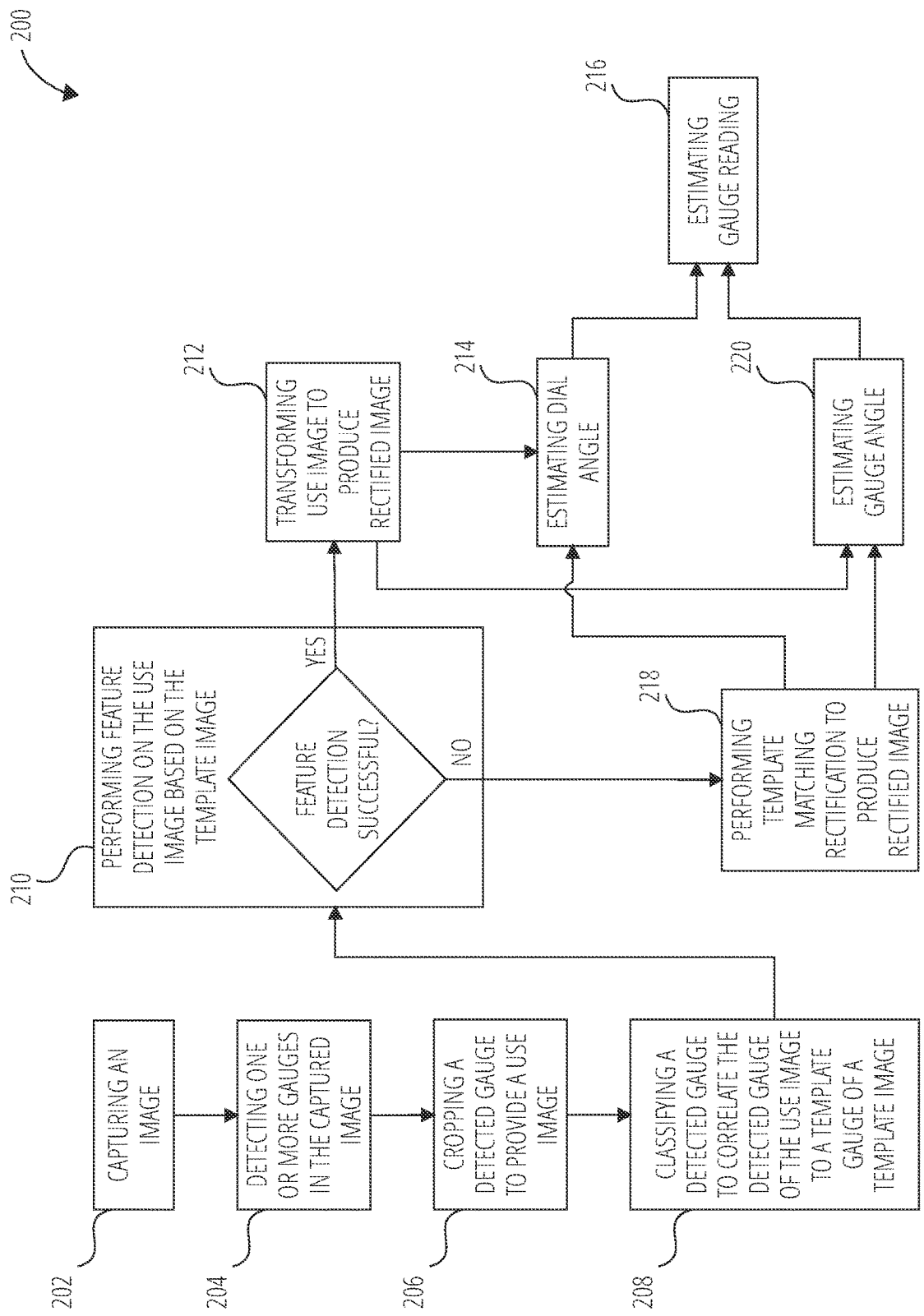
FIG. 2 is a flowchart illustrating a gauge reading method, according to some embodiments.

FIG. 2 is a flowchart illustrating a gauge reading method 200, according to some embodiments. The gauge reading method 200 is configured to enable automatic reading of one or more gauges (e.g., the one or more gauges 112a-112f of FIG. 1) from a captured image (e.g., one of the one or more captured images 118 of FIG. 1) even if the captured image is taken at an oblique angle to the one or more gauges. At operation 202 the gauge reading method 200 includes capturing an image. In some embodiments capturing an image includes capturing the image from an angle that is oblique to faces of the one or more gauges.

At operation 204 the gauge reading method 200 includes detecting one or more gauges in the captured image. In other words, in operation 204 the gauge reading method 200 may determine where a gauge is and/or gauges are in the captured image. In some embodiments detecting the one or more gauges in the captured image includes applying one or more thresholds to the captured image, blurring the thresholded captured image to generate a plurality of blurred images, detecting rounded shapes (e.g., corresponding to circular gauges) or trapezoidal/rectangular shapes (e.g., corresponding to rectangular gauges) in each of the blurred images, adding each of the blurred images together to produce a heatmap, and applying a threshold to the heatmap to produce a binary image including those of the detected rounded shapes detected in a threshold number or greater of the blurred images.

At operation 206 the gauge reading method 200 includes cropping a detected gauge to provide a use image. In some embodiments cropping the detected gauge in the captured image to provide the use image includes bounding the detected rounded shapes in the binary image into rectangular regions that contain the gauge, and providing sub-images of the captured image corresponding to the rectangular regions of the binary image. The cropped areas may be larger than the respective gauges as long as the cropped areas include the respective gauges. The use image may include one of the sub-images. In some embodiments operation 204, detecting one or more gauges in the captured image, and operation 206, cropping the detected gauge to provide the use image, may include performing a gauge detection processing flow 1000 discussed below with reference to FIG. 10.

At operation 208 the gauge reading method 200 includes classifying a detected gauge to correlate the detected gauge of the use image to a template gauge of a template image. Two methods of image decomposition were examined for the purposes of correctly identifying (classifying) the image type. These decomposition methods include histogram of oriented gradients (HOG) and feature detection. HOGs (McConnell 1982) apply a kernel filter to the image to calculate a gradient field. OpenCV's HOG (OpenCV Dev. Team 2019b) implementation constructs the kernel based on parameters supplied to the algorithm. The parameters allow for tuning the spatial frequency of the gradient decomposition. The kernel should be designed to capture the features of interest in the underlying image. The resulting gradient vectors are then binned resulting in a histogram describing the underlying image.

In this application, the kernel filter was tuned on four parameters/processes using gray or color, a Gaussian blur preprocessing pass, the size of the kernel filter (detection window, block size, cell size), and whether the histogram binning was signed or unsigned. Gradient selection based on gray scale images was found to be faster while having near-identical performance to color images. This is likely due to the monochromatic nature of most of the gauges. The Gaussian blur acts as a low-pass filter removing high-frequency noise from camera jitter and other artifacts that are not invariant to the gauge type. The detection window, block size, and cell size specify how the image is subdivided into sections and gradients are calculated for each of the sections. This allows the kernel to determine gradient coefficients that are at the relevant scale for the application. For example, for building a method to identify faces, if the method is analyzing portraits, the window should be fairly large relative to the image compared to an algorithm that is analyzing surveillance footage where faces would typically occupy a much smaller portion of the image. The gradient coefficients obtained for the kernel convolution may be positive or negative. Some applications of HOG have been empirically found to benefit from taking the unsigned (absolute values) of the coefficients, while others were found to benefit from taking the signed. Both signed and unsigned may be tried. The tuning may be performed manually by tweaking parameters and observing how those changes impact a correlation matrix of the histogram bin values with selected use images. At this stage, increasing accuracy may be important as well as attempting to reduce correlations between gauge templates in the test set.

A second method of image decomposition and identification was also explored. This method utilized feature detection algorithms (ORB: Oriented Features from accelerated segment test and Rotated Binary Robust Independent Elementary Features; BRISK: Binary Robust Invariant Scalable Keypoints; and KAZE) with Brute Force feature detection matching. ORB, BRISK, and KAZE are key point detectors. They take an image and identify key points of relevance-a fingerprint of the image that may be used to differentiate or identify it with other images. These could be based on edges, corners, blobs, or ridges in the image. They might operate at multiple spatial frequencies. The gauge classifier first extracts the features of the gauge backgrounds using a feature detector. Then to classify a gauge, the brute force OpenCV matcher is used to find matches between the feature sets. The matcher looks at the features in the first set and matches them with all the other features in second set using a distance calculation. The closest is determined to be the match. The set of matches is filtered by discarding those above a distance threshold. Fast approximate nearest neighbors (FLANN) is optimized for searchers in high-dimensional feature spaces. For each gauge in the set, the classified gauge is determined as the gauge with the most feature matches.

To test the developed methods of operation 208, classifying the detected gauge, a set of use images was produced by creating mock gauges. The mock gauges were created by mounting photograph facsimiles of the gauge backgrounds on circular pieces of foam core. The dials were made to spin freely by using small crafting rivets used as the shaft of the needle. The rivets were glued to the back side of the needles. Velcro was attached to the back of the gauges allowing them to be mounted to surfaces or stands. The use images used a tripod mount using the standard zoom lens camera of an iPhone 8 Plus. Several images of each of the gauges were taken with different readings to produce a test set of images for the gauge identification. Using a use image and HOG, the classified gauge was selected as the one with the highest correlation to the respective gauge.

The small amounts of blur can increase the efficacy of the classification, but more than small amounts can be detrimental. Accuracy decreases with very small images, but larger images have diminished returns for accuracy and exponentially impact processing time. Gray images were found to work as well as color images, and for the most part the images were monochromatic. Secondly, the white balance of the images was not consistent throughout the set and may lead to a non-generalizable classification tool. Lastly, unsigned gradient bins were empirically found to yield better results than signed gradients. The method was run on the set of 28 use images and the accuracy of identifying the correct gauge type was recorded. While the accuracy was found to be satisfactory, it was not realistic due to the need to operate on cropped and rectified images. The HOG decomposition is sensitive to changes in scale and use images that are not close to perfectly rectified, which impacts the accuracy of the gauge identification. When an extended raw use images set of 31 images was used through an image rectification method, the accuracy dropped to 41%. Furthermore, the processing time per image increased to an unreasonable 19.6 seconds per image.

The accuracy and speed of feature-detection-based identification for operation 208, classifying the detected gauge, was compared across maximum image sizes of 256, 512, 1024, and 2048 pixels. KAZE and BRISK had the highest performance but were also the slowest with KAZE taking nearly 2 seconds per image to reach 97% accuracy and BRISK requiring over 600 milliseconds with an Intel i7-3770k processor. ORB performed well when both accuracy and speed were taken into consideration, reaching 95% accuracy, with a processing time of only 70 milliseconds per image. For use images that are 1024 pixels or greater in size, the feature detection was chosen to use ORB with a max template size of 1024 pixels. For gauges with nominal dimensions smaller than 512 pixels, BRISK was deemed as more accurate but slower.

In summary, for operation 208, classifying the detected gauge, HOG gauge classification works well and is very fast but is unfortunately not practical because the use images should be nearly perfectly rectified for high-accuracy results. High-quality rectification is difficult when the gauge type is not known. The results here demonstrated that ORB feature detection is a fast and accurate choice for identifying gauges.

Once the detected gauge in the use image has been classified the gauge reading method 200 may rectify the gauge so that the gauge is circular (e.g., or rectangular for a rectangular gauge) using either one of two techniques:

feature detection or template matching. Specifically, if the captured image from which the use image is taken was captured at an oblique angle to the gauge corresponding to the detected gauge in the use image, the detected gauge may appear to have the shape of substantially an ellipse rather than a circle (e.g., or a trapezoid rather than a rectangle). Rectification of the use image may result in a rectified image including a substantially circularly-shaped face of the detected gauge (e.g., or substantially rectangular-shaped if the detected gauge is rectangular). By default, the feature detection technique is used because, if the feature detection technique works, it may provide more accurate results than the template matching technique. As a result, at operation 210 the gauge reading method 200 includes performing feature detection on the use image based on the template image. In feature detection, an attempt is made to identify common visual markings on a template gauge of the template image and the detected gauge of the use image. In some embodiments attempting to perform the feature detection rectification on the use image includes determining that the feature detection rectification failed responsive to a determination that fewer than a predetermined number of features (e.g., ten features) of the use image match features of the template image. If a set of critical markings are found, then a homography (e.g., a transformation matrix) is calculated between the use image and the template. The feature detection approach is well suited for high-resolution images and is robust to background noise. In some embodiments operation 210, performing the feature detection on the use image, includes performing a feature detection processing flow 300 discussed below with reference to FIG. 3.

If the feature detection of operation 210 is successful, the gauge reading method 200 proceeds to operation 212, which includes transforming the use image to produce a rectified image. In some embodiments, transforming the use image to produce the rectified image may include using the homography of the features identified in operation 210 to produce the rectified image.

If the feature detection of operation 210 fails, at operation 218 the gauge reading method 200 includes performing template matching rectification to produce the rectified image. Feature detection matching may fail when the use image has limited resolution or is degraded (e.g., noise, blur, etc.). When template matching fails, the gauge reading method 200 may fall back to a perspective correction approach utilizing template matching (see FIG. 4). Template matching is a technique that utilizes empirically derived perspective relationships to identify the homography and rectify the use image. In some embodiments performing the template matching rectification on the use image includes: blurring at least one of a saturation and a value of the use image; thresholding the blurred use image according to one or more thresholds to provide one or more binary threshold images; detecting contours in the one or more binary threshold images; fitting ellipses to the detected contours in the one or more binary threshold images; and rectifying the use image based on the fit of the ellipses to the detected contours in the one or more binary threshold images to provide the rectified image. In some embodiments operation 218, performing the template matching rectification to produce the rectified image, includes a template matching rectification processing flow 400 discussed below with reference to FIG. 4.

As discussed above, a gauge and dial orientation of the detected gauge in the use image may be captured using feature detection (operation 210) or template matching (operation 218). The use image is then realigned and/or rectified to virtually face the camera (e.g., the one or more image sensors 108 of FIG. 1) using a transformation matrix determined using feature detection or template matching. Once the use image is rectified (e.g., a rectified image is produced) in either operation 210 and operation 212 or operation 218, two additional pieces of information may be used to read the dial: the rotation of the detected gauge in the rectified image and the rotation of the dial in the rectified image. The gauge reading method 200 proceeds by identifying how the gauge and dial of the detected gauge in the use image are rotated relative to the frame. For example, at operation 220 the gauge reading method 200 includes estimating a gauge angle of the detected gauge, and at operation 214 the gauge reading method 200 includes estimating a dial angle of a dial of the detected gauge. In other words, the gauge and dial rotation angles of the detected gauge may be determined to compare to each other. If feature detection (operation 210) succeeded, then the rectified image has the same rotation as the template image. If, however, the feature detection (operation 210) failed, the rectified use image is rotated at 1-degree intervals and template matching is applied to identify the rotation angle as the one resulting in the greatest template matching coefficient. In some embodiments operation 220, estimating the gauge angle, includes a gauge angle estimation processing flow 800 discussed below with reference to FIG. 8. The angle of the dial relative to the image may also be calculated by rotating a dial template at 1-degree intervals and applying template matching with the rectified image. The dial angle estimation may be less noisy than the gauge angle. In some embodiments operation 214, estimating the dial angle, includes a dial angle estimation processing flow 900 discussed below with reference to FIG. 9.

The gauge reading method 200 then normalizes the gauges and reads the value. At operation 216 the gauge reading method 200 includes estimating gauge readings of the detected gauge based on the estimated gauge angle and the estimated dial angle estimated in operation 220 and operation 214, respectively. In some embodiments the gauge reading estimate may be determined by comparing the estimated gauge angle to the estimated dial angle. A priori knowledge of minimum and maximum values of the detected gauge (e.g., of the correlated template gauge) and their corresponding angles may be used to estimate the gauge reading. Also, it may be assumed that the detected gauge includes a single dial that rotates about a center point of the detected gauge.

It is noted that known alignment methods in the art may be used to perform operation 214 and/or operation 220. For example, image alignment routines are available from open source locations such as the National Library of Medicine Insight Segmentation and Registration Toolkit (referred to as Insight toolkit—ITK) Software Guide. ITK enables rapid prototyping and faster exploration of ideas by shortening the edit-compile-execute cycle. Another tool is the Image Processing Toolbox in MathWorks (2018). Within the tool, an Intensity-Based Automatic Image Registration process is an example of a ready tool to automatically align 2-D-based images.

Similarly, known gauge reading methods in the art may be used to perform operation 216. For example, several apps are available that were originally developed for reading power meters. As a specific non-limiting example, Pixometer (2018) has a software developer's kit for their mobile-based software with a plug-in module for reading round analog meters. Anyline (2018) has another software developer's kit and provides a variety of mobile-based software packages for smart meter reading, license plate scanning, and Optical Character Recognition applications. Such tools are often provided as a black box in terms of configuring the meter reading algorithms. Analog Gauge Reader examples were also found on GitHub (GitHub 2018). This sample application takes an image or video frame of an analog gauge and reads the value using functions from an OpenCV computer vision library. It consists of two parts: calibration and measurement. During calibration, the application calibrates an image of a gauge (provided by the user) by prompting the user to enter the range of gauge values (e.g., in degrees). It then uses these calibrated values in the measurement stage to convert the angle of the dial into a meaningful value. None of the systems in the included references appeared to be capable of reading gauges taken from oblique angles. As a result, these systems would use a rectified image produced by operation 212 or operation 218.

It is also noted that various different software platforms may be used to implement the gauge reading method 200. For example, Python is expressive and well suited for rapid development. Python and most third-party modules (including OpenCV) may be well suited for deployment or commercialization.

Two experiments were conducted to evaluate the gauge reading method 200. The first experiment involved reading of a single gauge at various angles. The second experiment involved reading of a gauge in a panoramic 360-degree image. Images of two different five inch round gauges were captured using two different cameras. The cameras used were a Hasselblad HB4116 4000×2992 (12 MP) module attached to a MotoZ smartphone, and the built-in camera 3264×2448 (8MP) in a Samsung Galaxy S2 eight inch tablet. Both cameras were hand-held and the images were taken as the gauge was close to the center of the camera's field of view. Initially, all of the images were captured with the camera positioned perpendicular (as close as possible with manual adjustment) to the gauge face. The captured images were of pressure gauges on a water pump with good lighting. The first set of images was captured with the pump turned "on," and the second set of images was captured with the pump "off." The pressure was higher in the pump "on" condition than in the pump "off" condition. Each camera was set in the full auto mode that used the camera software to set the camera metering functions (e.g., F-stop, exposure time, and ISO speed). Each of the cameras were set at maximum field of view (no zoom). Two sets of images were captured: the first set with the camera positioned approximately 12 inches from the front of the gauge and the second set with the camera positioned approximately 24 inches from the front of the gauges. Each set of images has one image with the pump on and one with the pump off. The 12 inch position captured individual gauges and the 24 inch position captured both gauges in a single image.

A second series of images were captured of the round gauges with the Samsung Galaxy S2 8-in. tablet camera to evaluate the ability to develop software routines that compensate for images taken at various angles. The camera was placed at the 12 inch position to capture images of the individual gauges. The camera was placed on axis and then moved horizontally to the side in increments of 20 to 60 degrees to acquire a series of four images at 0, 20, 40, and 60 degrees. The camera was then moved vertically in 20-degree increments to 60 degrees (20, 40, and 60 degrees pointing down) and with images taken at 0, 20, 40, and 60 degrees pointing at the side (FIG. 12), resulting in 16 horizontal and vertical angle combinations. The environment contained both natural and artificial illumination. The illumination was sufficient such that all images were taken at f/1.9 with a $\frac{1}{30}$s exposure and ISO-64 or ISO-80. The full-resolution images were manually cropped in and scaled by 50% such that the resulting images had the gauge centered and were roughly square with dimensions around 600×600. For additional reduced resolution testing these images were scaled by 50% and 25%.

Use of a panoramic view up to 360 degrees was explored for logging in measurements in a local control room environment. The primary challenges related to panoramic inspection tools like this are having adequate image quality and resolution to ensure the quality of the resulting image is sufficient for processing across the panel. An example of a commercially available camera that approach these capabilities is the Insta360 Pro camera system. The Insta360 Pro has six 12-MP (4000×3000) digital cameras with 200-degree lenses and can automatically stitch the camera images into a panoramic image that has a resolution of 7680×3840 (29 MP). The Insta360 Pro was used to capture a full 360-degree panorama of an instrument laboratory at approximately 8 feet (2.4 m) from the camera were two 5 inch (12.7 cm) gauges, one of which was used for a use image set. Three images were captured at roughly 30-minute intervals. In each of the three images, the two gauges were manually cropped from the 360-degree panorama resulting in a set of six images, with each image roughly 70×70 pixels in size.

Feature detection (e.g., operation 210) allows for features of a template image to be identified in an off-angle perspective. The matching points can be used to define a transformation matrix. The OpenCV-contrib-python library contains an implementation of David Lowe's (1999) Scale-Invariant Feature Transform (SIFT) algorithm. OpenCV includes several free-feature detectors: ORB, BRISK, KAZE. SIFT manifested relatively good overall performance. KAZE was able to match $\frac{8}{16}$ use images as compared to $\frac{10}{16}$ for SIFT with the 600×600 pixel sized images discussed above from the experiments. With 300×300 pixel images KAZE performance was on par with SIFT. Notably, reading for a 0° vertical and 60° horizontal use image was more accurate with KAZE as compared to SIFT.

The feature detection approach (operation 210) is advantageous with high-resolution images and is less susceptible to background noise than template matching (operation 218). Feature detection uses images of relatively high resolution (e.g., 300×300 pixels or larger) and may require knowing the meter type a priori. In practice, feature detection may be used to detect the dial type (e.g., in operation 208) by applying matching to a set of meter templates. If the feature detection cannot determine a matching transformation it falls back to template matching (operation 218), as discussed above.

The feature detection-based method (operation 210) may have less variability in the gauge value estimates than the operation 218. Across nine use images for angles of 0°, 20°, and 40°, the variability of template matching in readings were 6.44 pound-force per square inch (PSI) compared to 0.5 PSI for the feature detection. Across these nine readings, the average reading for template matching was 76.778 PSI versus 74 PSI for the feature detector. The true reading was 75 PSI. When the feature detector is able to determine a transformation between the two images, the estimates tend to be more robust compared to those of template matching. In cases where image quality is degraded, template matching may sometimes yield values that are quite far from the actual values.

Feature detection performance was also systematically examined with images at 600×600 pixels (large), 300×300 pixels (medium), and 150×150 pixels (small). Results from these examinations suggest that at smaller image sizes, feature detection becomes less viable. Also, the SIFT algorithm was more robust to scale variability compared to KAZE feature detection. Reduced image resolution negatively impacted the accuracy of the template matching algorithm and accuracy decreased with additional off-axis angles. The feature detection algorithms worked relatively well with medium-sized images. This may be partly because the use images (300×300 pixels) were close in resolution to the meter templates (256×256 pixels) used in the examinations.

Adaptations may be made to the gauge reading method 200 to improve the accuracy of the gauge and dial angle estimates (e.g., operation 214 and operation 220). As previously discussed, the gauge reading method 200 includes image rectification (e.g., via feature detection using operation 210 and operation 212 or via template matching using operation 218), estimating the gauge angle (via operation 220), and estimating the dial angle (via operation 214). Once the gauge angle and the dial angle are known, the value to be read from the gauge may be easily estimated (e.g., via operation 216). As previously discussed, one way to estimate the dial angle (operation 214) is to correlate a needle template with the rectified image. This part of the gauge reading method 200 may be improved for accuracy.

For example, a Pearson correlation coefficient between a dial template at 360 evenly spaced rotations and the rectified and resized image being read may be calculated. The dial angle is obtained (e.g., in operation 214) as the angle with the greatest correlation coefficient. Then the angle of the gauge is determined (e.g., in operation 220) by correlated the meter background (e.g., a gauge template) with the rectified image. After the needle angle and gauge angle are known, then the value of the gauge can be estimated. A set of dial templates for 360 angles may be preprocessed by compositing high-quality dial templates on top of the meter background image template. The composited needle templates may be used to determine the dial angle by correlating the composited images with the rectified image at 360 evenly spaced rotations of the rectified use image.

In order to make use of the composite dial templates, 29 images in a test set that could be correctly classified were used to establish a baseline accuracy rate. Absolute percent errors were calculated as:

$$100 \frac{|\text{reading} - \text{actual value}|}{\text{Range of gauge}}$$

The results of the initial testing were encouraging. However, in the course of implementing the dial composition into the gauge reading method 200, numerous other small modifications and parameter adjustments were made. Most notable, the dial estimation (operation 214) used dial templates 180 degrees out of phase. The original gauge reading method 200 would correct dial estimates when the dial estimate was found to be outside the range of the gauge (i.e., not pointing at a valid value because of the needle being a line that may identify in either direction) by taking the reading 180 degrees from the estimated needle angle. To isolate the effect of dial composition versus no-composition, a method was adapted to allow both methods and a second set of use images were generated and examined. The results showed a narrower difference in performance between the dial composition and using no-composition templates. The dial composition was able to read 34 of 45 with less than 5% error compared to only 30 of 45. At the 10% error threshold, the results are even narrower with dial composition besting no-composition 35 to 33. This suggests that much of the performance gained over the baseline implementation was from parameterization modifications and bug fixes (dial templates 180 degrees out of phase described above) to the method. In summary, the new method was able to obtain reasonable estimates (within 10% error) for 78% of images in the validation set. For comparison, the baseline method was only able to obtain reasonable estimates for 31% of the images.

To further investigate the performance of the method, a test set of 43 images was created of a single gauge with a fixed value of 10.0 at slightly varied perspectives. This dataset revealed that gauge readings were normally distributed but were biased due to perspective distortions with the gauge templates.

Because the gauge templates were generated from photographs of the gauges, the gauges in these images were not perfectly rectilinear to the camera. This introduces small but meaningful biases in the readings. Calibration curves (similar to lookup tables) were created by identifying the correct angle from the gauge templates at the major division values of each gauge. The method then linearly interpolated these curves after obtaining the estimated needle angle to arrive at the gauge reading. Across the set of six gauges, this was found to significantly increase the number of readings with less than 1% error. With the validation image set, 24 of 45 images were read with 1% error compared to 17 of 45 without calibration. Calibration may be used to compensate for distortions in gauge templates. If templates could be captured using a flatbed scanner or from digital files supplied by gauge manufacturers, calibration may not be used. However, it is feasible that in real-world settings gauge templates would be constructed from photographs of gauges in the field and calibration would improve the accuracy of readings.

Figure 3:
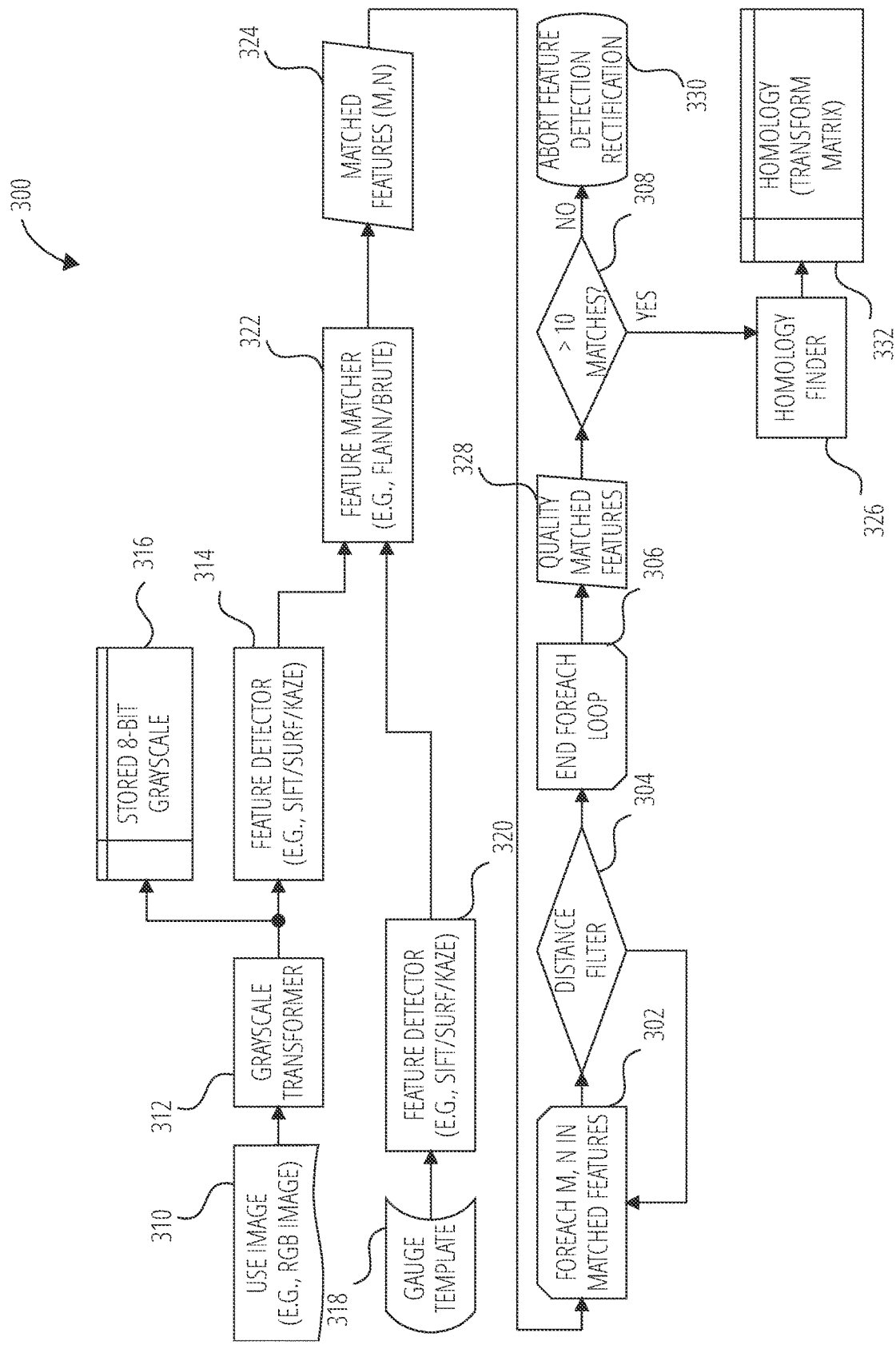
FIG. 3 is a feature detection processing flow, according to some embodiments.

FIG. 3 is a feature detection processing flow 300, according to some embodiments. Inputs to the feature detection processing flow 300 include a use image 310 (e.g., one of the one or more use images 120 of FIG. 1) and a gauge template 318 (e.g., as pictured in one of the one or more template images 106 of FIG. 1). As previously discussed, the use image 310 may include a sub-image of one of the one or more captured images 118 of FIG. 1, the sub-image illustrating a detected gauge. The gauge template 318 may include an image of a template gauge that has been correlated with the use image 310.

The feature detection processing flow 300 includes a grayscale transformer 312 may be configured to transform the use image 310 into a stored 8-bit grayscale 316 version of the use image 310, which may be stored in the one or more data storage devices 104 of FIG. 1. Both the stored 8-bit grayscale 316 and the gauge template 318 may be applied to feature detectors. For example, the stored 8-bit grayscale 316 may be applied to feature detector 314 and the gauge template 318 may be applied to feature detector 320. Gauge orientation is based on image registration methods: keypoint identification (feature or template), matching, transform generation, and transform application. Keypoint identification is based on identifying which pixels are of interest (keypoints) from the two images, and are used to extract additional information about that keypoint such as scale and orientation. The feature detector 314 and the feature detector 320 are configured to detect such keypoints in the stored 8-bit grayscale 316 and the gauge template 318, respectively.

The keypoint selection may be random or based on certain features, such as corners. Another approach may be to acquire keypoint information with Fast Retina Keypoint (FREAK) descriptor. The benefit of FREAK descriptor is that it incorporates information about scale and rotation so that keypoints may be matched even if secondary images are captured at different angles, which may occur when using a fixed position camera in a large control room within a nuclear power plant control room. Feature detection using a Harris detector, which gives relatively good results based on performance, has firm invariance to scale, rotation angle, illuminance, and noise compared to other feature detection methods. Image alignment techniques and features like object recognition and methods for speedup and increased accuracy may be used in contrast to pixel-based image alignment methods. Image alignment techniques may be used in change detection algorithms for remote sensing and video surveillance. A feature-based approach using a Laplacian of Gaussian (LOG) zero-crossing edge detector for enhanced feature extraction may be used to accurately define keypoints used during the automatic alignment process. Scale-Invariant Feature Transform (SIFT) or Speeded Up Robust Features (SURF) may be used to detect features in a template of the dial being read and the image being examined. KAZE, a multiscale 2-D feature detection and description algorithm may be used, but its performance is dependent on the scale of the images being examined. Methods utilizing Oriented FAST and rotated BRIEF (ORB) and Binary Robust Invariant Scalable Keypoints (BRISK) may not be suitable for this application. Accordingly, by way of non-limiting examples, the feature detector 314 and the feature detector 320 may be configured to employ SIFT, SURF, KAZE, other feature detection techniques, or combinations thereof.

The features detected in the stored 8-bit grayscale 316 and the gauge template 318 by the feature detector 314 and feature detector 320, respectively, are provided to a feature matcher 322, which is configured to identify and provide matched features 324 between the stored 8-bit grayscale 316 and the gauge template 318. These matched features 324 may include use image features M from the stored 8-bit grayscale 316 and template features N from the gauge template 318, which have been identified as possible matches by the feature matcher 322. The matched features 324 are then passed to a foreach loop having a foreach loop beginning 302 and a foreach loop ending 306 illustrated in the feature detection processing flow 300. In the foreach loop, a distance filter 304 is used to identify, for each of the matched features between M and N, which of the matches are quality matched features 328. By way of non-limiting example, the distance filter 304 may be configured to identify distances between identified features M, N in the stored 8-bit grayscale 316 and the gauge template 318 to determine whether the identified features M, N truly should be matches (e.g., determine whether the identified features M are spaced the same way as the identified features N).

At decision 308 it is determined whether the number of quality matched features 328 is greater than a predetermined threshold number (e.g., 10 shown in FIG. 3) of matches. If the number of the quality matched features 328 is not greater than the predetermined threshold number of matches the feature detection processing flow 300 may abort feature detection rectification 330, and the feature detection processing flow 300 may end. In other words, a determination may be made that feature detection failed (e.g., a "NO" in operation 210 of FIG. 2). If, however, the number of the quality matched features 328 is greater than the predetermined threshold, a homology finder 326 may be used to identify a homology 332 to transform the stored 8-bit grayscale 316 to the gauge template 318.

In summary, once the key points are identified (e.g., by the feature detector 314 and the feature detector 320), the features have been matched (e.g., by the feature matcher 322), the quality matched features (e.g., quality matched features 328) have been identified, and the number of the quality matched features is determined to be greater than the predetermined threshold (e.g., >10 matches in decision 308), the homology finder 326 may achieve an alignment process by determining a transform matrix (a homology 332) that will project the stored 8-bit grayscale 316 onto the gauge template 318. The homology finder 326 may determine the feature matcher 322 using the optimized matched keypoints M, N (e.g., identified by the feature matcher 322). This transform accounts for possible translation, scale, rotation and even parallax (images of the same scene are viewed from different angles). A robust and accurate routine applies feature detection with a Fast Library for Approximate Nearest Neighbor (FLANN) search matching to correct the perspective of the image. This process and application may be used in computer vision. The feature matcher 322 may be used in operation 212 of FIG. 2 to transform the use image (e.g., the use image 310) to produce the rectified image.

Figure 4:
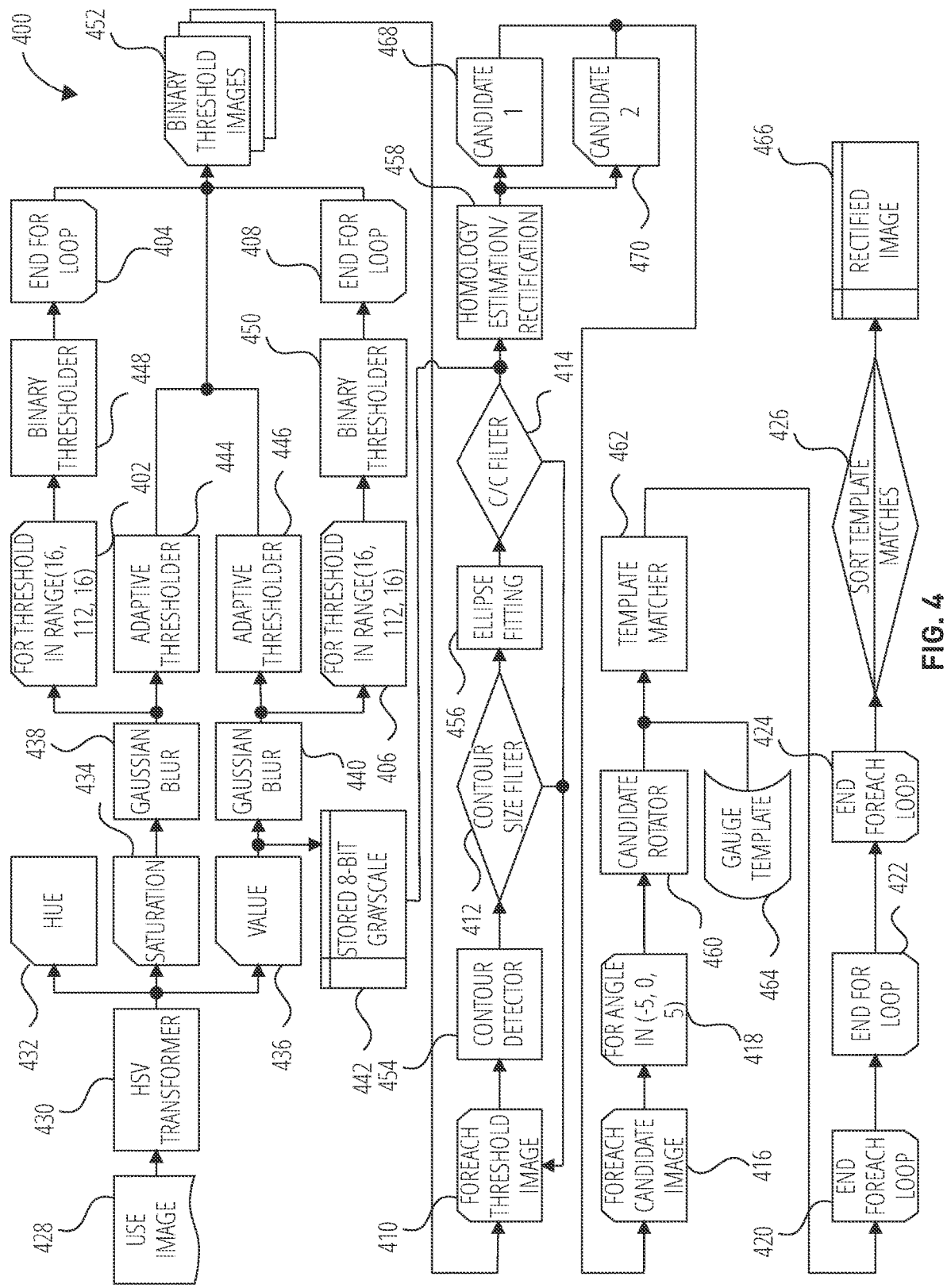
FIG. 4 is a template matching rectification processing flow, according to some embodiments.

FIG. 4 is a template matching rectification processing flow 400, according to some embodiments. An input to the template matching rectification processing flow 400 may include a use image 428, which may be one of the subimages identified in one of the one or more captured images 118 of FIG. 1. The use image 428 includes an image of a detected gauge. The template matching rectification processing flow 400 includes a hue, saturation, value transformer (HSV transformer 430) configured to transform the use image 428 into hue 432, saturation 434, and value 436 images. By way of non-limiting example, the use image 428 may include a color 24-bit RGB (Red/Green/Blue) image and the HSV transformer 430 may be configured to transform the use image 428 into hue 432, saturation 434, and value 436 channels. The hue 432 channel may be discarded. The value 436 channel may be stored as a stored 8-bit grayscale 442. The template matching rectification processing flow 400 may apply Gaussian blur to the saturation 434 and value 436 channels. Specifically, a Gaussian blur 438 may be applied to the saturation 434 channel and a Gaussian blur 440 may be applied to the value 436.

The template matching rectification processing flow 400 applies adaptive Gaussian thresholding to the blurred saturation and value channels via adaptive thresholder 444 and adaptive thresholder 446, respectively. The template matching rectification processing flow 400 also applies binary thresholding to the blurred saturation and value channels via binary thresholder 448 and binary thresholder 450, respectively, at seven linearly spaced intervals between the minimum and maximum value of the channels. For loops for thresholds in the range (start=16, stop=112, step=16) may be used. For example, for the blurred saturation channel, a for loop opening block 402, the binary thresholder 448, and a for loop closing block 404 may be used. For the value channel, a for loop opening block 406, the binary thresholder 450, and a for loop closing block 408 may be used. Results from the adaptive thresholders (adaptive thresholder 444, adaptive thresholder 446) and the binary thresholders (binary thresholder 448, binary thresholder 450) may be provided to as binary threshold images 452. The binary threshold images 452 may include a set of binary (e.g., black and white) thresholded images (sometimes referred to herein merely as "threshold images" for simplicity).

For each threshold image of the binary threshold images 452 in the binary threshold images 452 (e.g., implemented using a foreach loop including a foreach loop opening block 410 and a foreach loop closing block 424), contour detection may be applied and the contours may be filtered as potentially representing a circular face of the detected gauge of the use image 428. For example, the template matching rectification processing flow 400 includes a contour detector 454 and a contour size filter 412 configured to detect and filter, respectively, the binary threshold images 452. The template matching rectification processing flow 400 also includes ellipse fitting 456 and a circularity/coverage filter 414. The filtering of the circularity/coverage filter 414 may use area, perimeter, and location of contours identified by the contour detector 454, as well as characteristics of an ellipse, to fit to the contours (minor axis, major axis, center location, perimeter, and area of ellipse). After filtering, using the circularity/coverage filter 414, potential ellipses representing the face may be identified, and potential homography homology transforms 458 may be identified for each ellipse. In the example illustrated in FIG. 4, two potential homography transforms were identified for each ellipse: candidate 1 468 and candidate 2 470.

The homography homology transforms 458 correct the scale of the image and return the rotation to the original angle of the use image 428. Using another foreach loop, shown using foreach loop opening block 416 and foreach loop closing block 420, each of the found transforms (e.g., candidate 1 468 and candidate 2 470) may be applied to the use image 428 and the best candidate may be selected as the rectified image with the greatest template matching coefficient with respect to a template image from applying a 2-D convolution-based template matching routine with a grayscale image of the gauge's background. For example, within the foreach loop, a for loop, indicated using for loop opening block 418 and for loop closing block 422, may be used with a candidate rotator 460 and a gauge template 464 (the template image) and a template matcher 462 to determine which candidate best matches the gauge template. In some embodiments the best candidate may be selected by applying rotation transformations at 1-degree intervals and matching each of these to the template. If it may be assumed that the dial in the use image is close to plum, then just applying transformations of −5, 0 and 5-degrees (see the for loop opening block 418) may substantially decreases the processing time of the template matching. The template matching rectification processing flow 400 may sort template matches 426 and provide a rectified image 466, which may be produced in operation 218 of FIG. 2.

When a perfectly circular gauge is perpendicular to a camera its projection is a perfect circle. As the gauge rotates, however, the projected image becomes elongated into an ellipse. The size and location of the ellipse ambiguously describes how it is rotated in 3-dimensional space.

Figure 5:
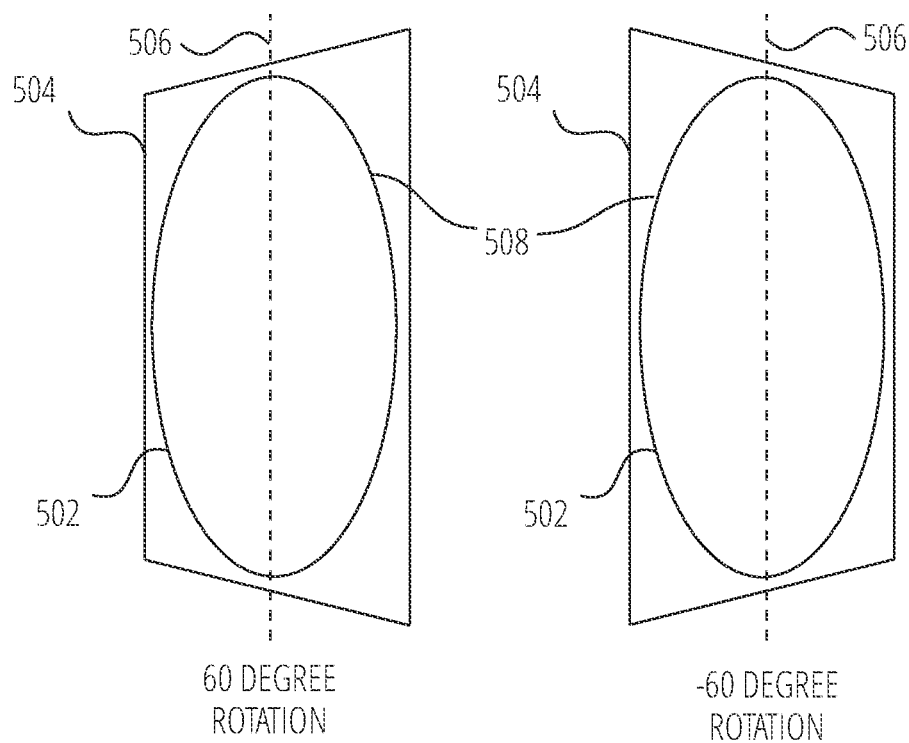
FIG. 5 illustrates a circle on a square background that is rotated 60° about its vertical axis and −60° about its vertical axis.

FIG. 5 illustrates a circle 502 on a square background 504 that is rotated 60° about its vertical axis 506 (y-axis) and −60° about its vertical axis 506. The projected ellipses 508 responsive to the two rotations of the circle 502 are identical. From FIG. 5 we may see that the square background 504 becomes a trapezoid and the parallel sides of the trapezoid are parallel to the major axis of the ellipse.

In template matching (e.g., operation 218), an ellipse may be detected and minor and major axes of the ellipse as well as its location and angle within the image may be detected. The inertia or elongatedness of the ellipse (minor axis/major axis), minor axis length, and angle are used to construct two transformation matrices, one corresponding to a first direction of elongation and another corresponding to a second direction of elongation (e.g., because the detected ellipse could be the result of elongation in either direction, as illustrated in FIG. 5).

An empirical analysis may be conducted in Unity3D (a cross-platform game engine) to determine how inertia and the shape of the background change as a function of angle. It may be assumed that the trapezoidal background is an isosceles trapezoid where the parallel sides are parallel to the major axis of the ellipse. The end products of the empirical analysis are two functions over the domain of 0° to 90° describing:

$$f\_short(inertia) = \frac{minor\ axis}{short\ parallel\ trapezoid\ side},$$

$$f\_long(inertia) = \frac{minor\ axis}{long\ parallel\ trapezoid\ side}$$

The length of the minor axis and inertia are obtainable from an off-angle image of a circular gauge. The above functions are used to determine the length of the parallel sides of a hypothetical square background (e.g., similar to the square background of FIG. 5) sharing the same plane as the circular gauge (e.g., similar to the circle of FIG. 5). These functions are plotted in FIG. 6.

Figure 6:
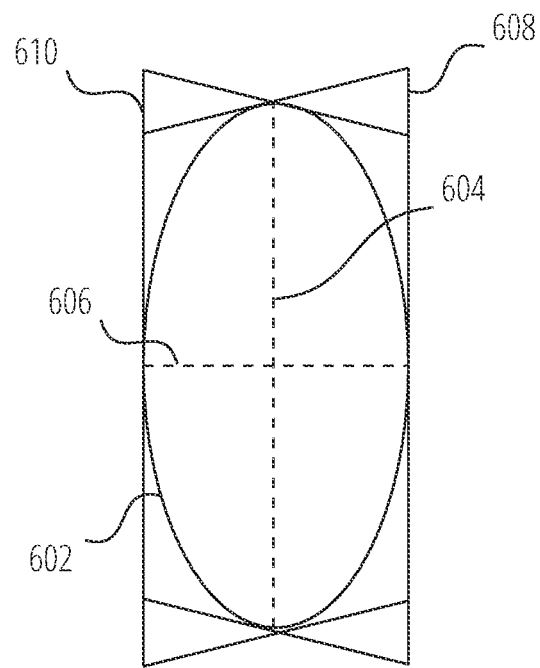
FIG. 6 is a graphical representation of a projected ellipse corresponding to a detected contour, according to some embodiments.

FIG. 6 is a graphical representation of a detected ellipse corresponding to a detected contour (e.g., at contour detector and ellipse fitting of FIG. 4), according to some embodiments. The detected ellipse may be detected by the template matching rectification processing flow 400. The detected ellipse 602 includes detected axes (e.g., a vertical axis 604 and a horizontal axis 606). FIG. 6 also illustrates a first hypothetical square background 608 and a second hypothetical square background 610 (shaped as trapezoids in FIG. 6) based on the detected ellipse 602. One of the first hypothetical square background 608 and the second hypothetical square background 610 is correct and should match the square background image of the use image. Corner locations of the first hypothetical square background 608 and the second hypothetical square background 610 may be computed by defining an affine rotation matrix from the detected angle of the ellipse, the minor axis (the horizontal axis 606 in this case), and the length of the parallel sides, as illustrated in FIG. 7.

Figure 7:
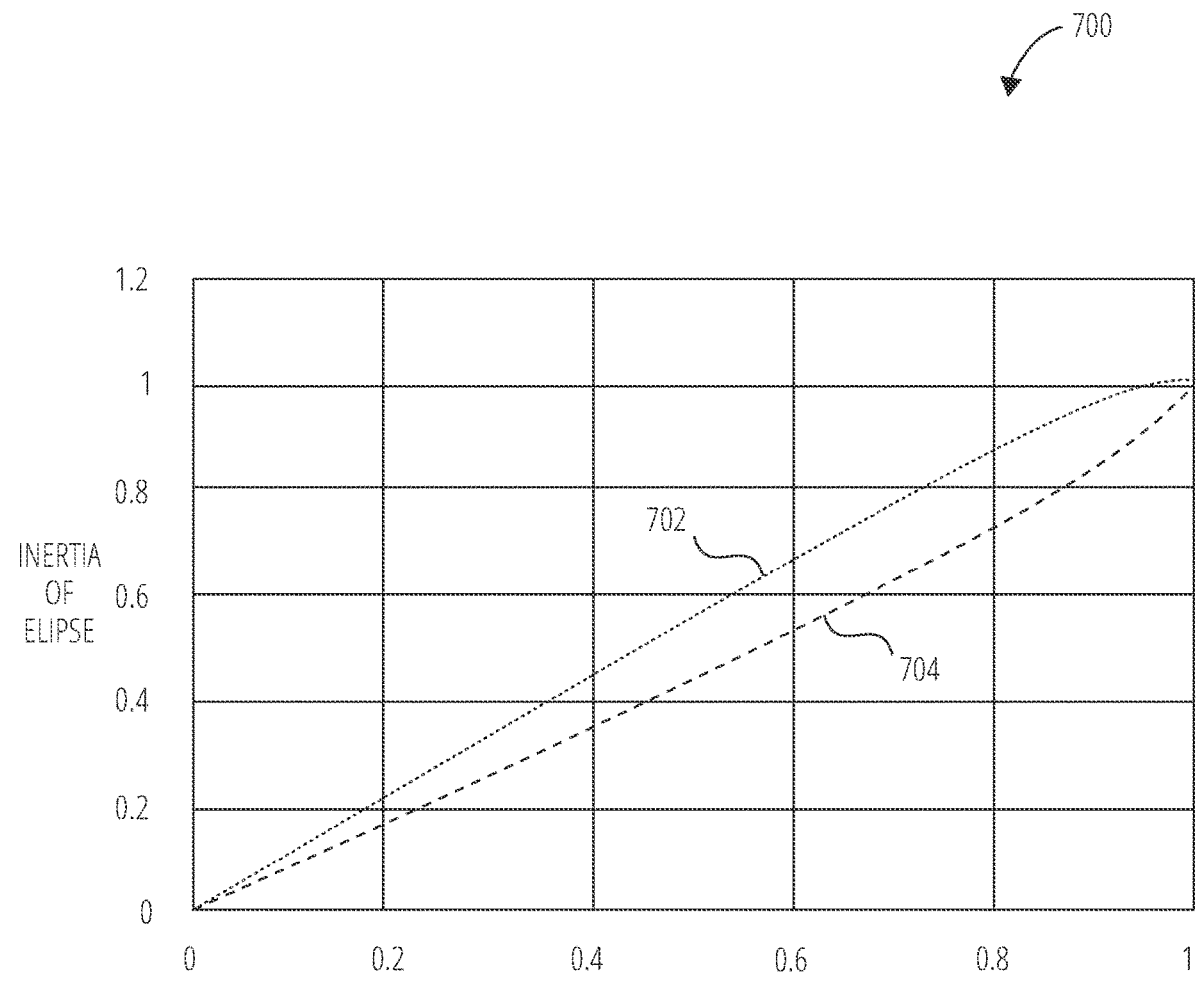
FIG. 7 is a plot illustrating a relationship between inertia of the detected ellipse of FIG. 6 and a background homography, according to some embodiments.

FIG. 7 is a plot 700 illustrating a relationship between inertia of the detected ellipse 602 of FIG. 6 and a background homography, according to some embodiments. The plot 700 includes a short trap length width plot 702 (dotted line) and a long trap length width plot 704 (dashed line). This approach may be empirical rather than mathematical, and the estimated relationship may depend on the projection geometry of the camera used in the Unity3D project. However, the estimated relationship is close enough to yield reasonable results.

With the template matching the rectification (e.g., operation 218 of FIG. 2, template matching rectification processing flow 400 of FIG. 4), identifying the best ellipse is of critical importance. As previously discussed, a larger set of threshold images may be created by segregating a color image of the gauge into HSV channels (e.g., separating the use image 428 into hue 432, saturation 434, and value 436 channels using an HSV transformer 430, as illustrated in FIG. 4). The hue channel is discarded and for both the saturation and value channels several black and white input images (e.g., the binary threshold images 452 of FIG. 4) are created by normalizing the images to 8-bits (0-255) and thresholding at values of 16, 32, 48, 64, 80, 96, and 112 (e.g., using the binary thresholder 448 and the binary thresholder 450 of FIG. 4) as well as applying the adaptive threshold routine (e.g., using adaptive thresholder 444 and adaptive thresholder 446 of FIG. 4). The contouring and ellipse detection may be run on each of the 16 black and white thresholded images (e.g., using the contour detector 454, the contour size filter 412, the ellipse fitting 456, and the circularity/coverage filter 414 of FIG. 4). The contouring may be insensitive to whether the thresholding is inverted. For each contour an ellipse may be fitted and two measures of circularity (e.g., quality) may be assessed as well as a measure of coverage (area of the ellipse occupying the image) using the following equations:

$$\tau = 2\pi$$

$$\text{radius\_}est\text{\_by\_area} = \sqrt{\frac{\text{contour•area}}{\pi}}$$

$$\text{circularity}_1 = \frac{\text{radius\_}est\text{\_by\_area} * \tau}{\text{contour•perimeter}}$$

$$\text{ellipse} = fitEllipse(\text{contour})$$

$$a = \frac{\text{ellipse•}ax}{2}$$

$$b = \frac{\text{ellipse•}bx}{2}$$

$$\text{ellipse\_perimeter} = \pi * \left(3*(a+b) - \sqrt{(3*a+b)*(a+3*b)}\right)$$

$$\text{circularity}_2 = \frac{\text{radius\_}est\text{\_by\_area} * \tau}{\text{ellipse\_perimeter}}$$

$$\text{circularity} = 1.0 - \min\left(\begin{array}{l}\text{clamp}_0^1(|\text{circularity}_1 - 1.0|), \\ \text{clamp}_0^1(|\text{circularity}_2 - 1.0|)\end{array}\right)$$

$$\text{coverage} = \frac{\max(\text{contour•area}, \pi*a*b)}{img\text{•width}*img\text{•height}}$$

The circularity metric may be transformed and bounded such that the circularity metric is 1.0 if the contour is a perfect circle and 0.0 if circularity metric is not circular. The circularity and coverage (area of image containing contour/ellipse) may be used to filter ellipses not likely to represent the face of the gauge by rejecting contours with circularity less than 0.5 or coverage not between 0.2 and 0.9. For each of the remaining ellipses, the two hypothetical perspective corrections may be applied and the variability of contour sizes may be used to select the best correction. Template matching may be applied to the set of warped ellipses to select the best candidate for reading the gauge. The meter and dial angle analysis may proceed as previous discussed (e.g., in operation 220 and operation 214 of FIG. 2).

The template matching yields a coefficient of determination. A quality metric may be calculated as the Euclidean norm of the coefficient of determination and circularity measure previously discussed. Responsive to a statistical regression performed between the quality metric and the log transformed absolute errors of the readings, a small but significant relationship was found suggesting that the quality metric is related to the accuracy of the gauge reading obtained by the gauge reading method 200 of FIG. 2.

Figure 8:
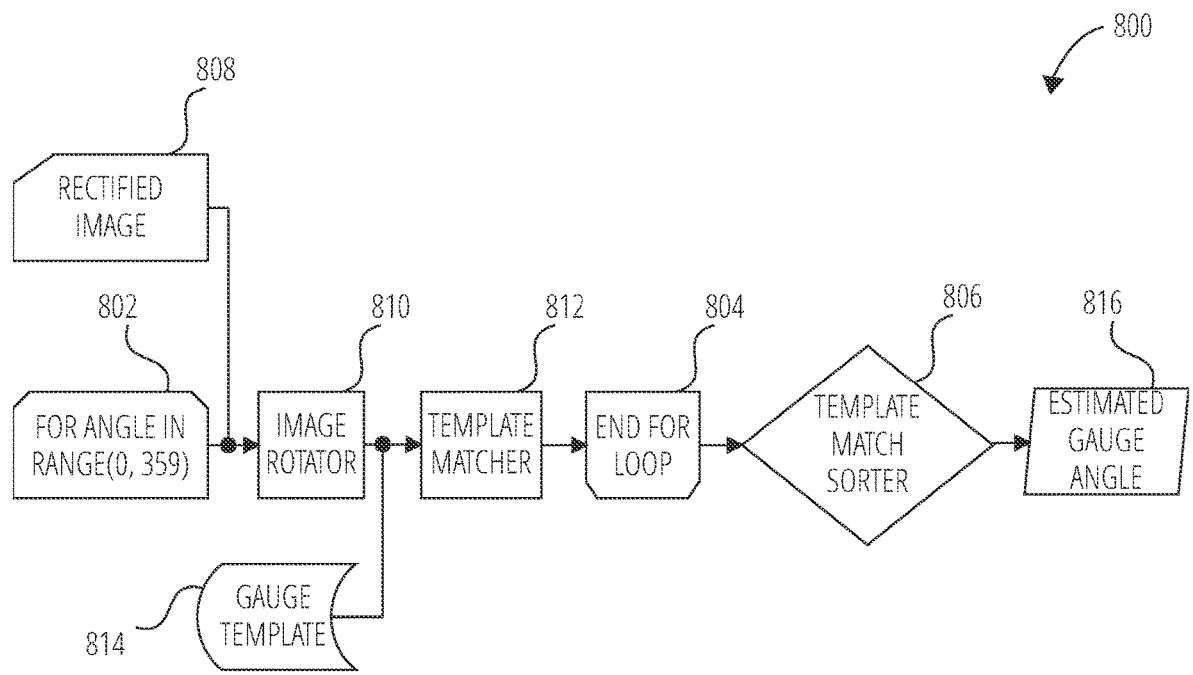
FIG. 8 is a gauge angle estimation processing flow, according to some embodiments.

FIG. 8 is a gauge angle estimation processing flow 800, according to some embodiments. Inputs to the gauge angle estimation processing flow 800 include a rectified image 808 and a gauge template 814. The rectified image 808 may include an image rectified using feature detection (operation 210 and operation 212 of FIG. 2) or template matching (operation 218 of FIG. 2). If feature detection (operation 210) succeeded, then the rectified image 808 has the same rotation as the gauge template 814. If, however, the feature detection (operation 210) failed, the gauge angle estimation processing flow 800 may be applied.

The gauge angle estimation processing flow 800 includes a for loop (defined using a for loop opening block 802 and a for loop closing block 804) used to rotate (using an image rotator 810) the rectified image 808 at 1-degree intervals and template matching is applied using a template matcher 812 to match the rotated version of the rectified image 808 to the gauge template 814. A template match sorter 806 is used to identify one of the rotation angles as the one resulting in the greatest template matching coefficient between the rotated version of the rectified image 808 and the gauge template 814 as determined by the template matcher 812. Accordingly, the gauge angle estimation processing flow 800 determines an estimated gauge angle 816, which may be provided as the result of operation 220 (estimating gauge angle) of FIG. 2.

Figure 9:
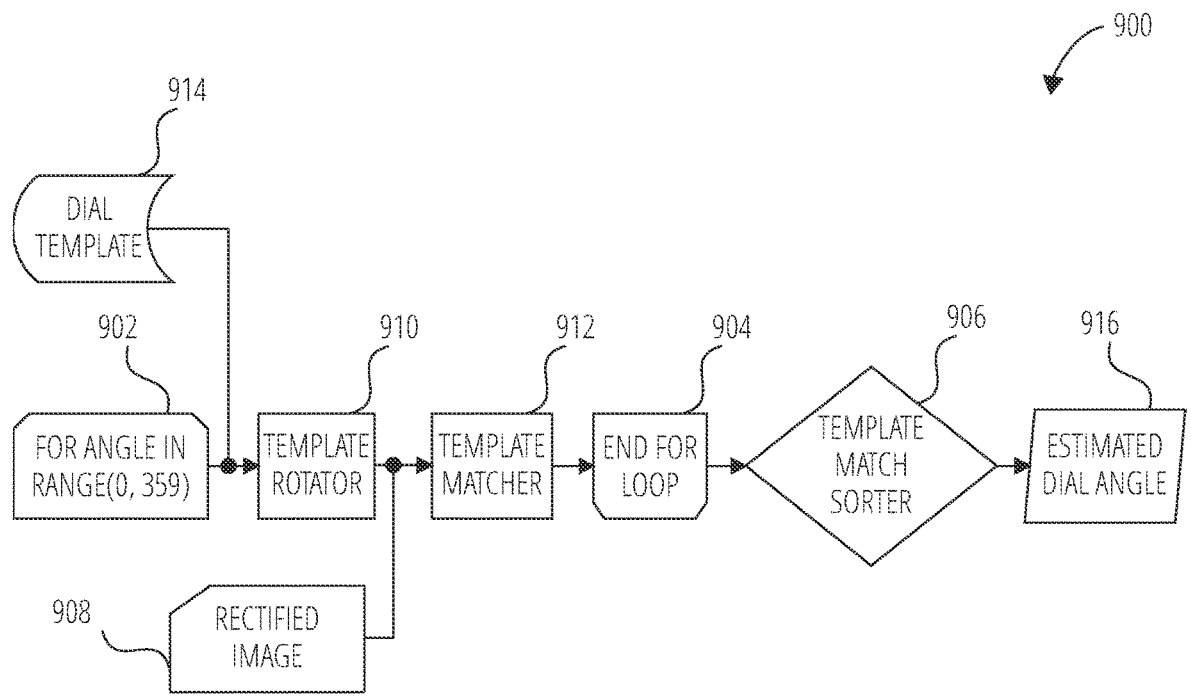
FIG. 9 is a dial angle estimation processing flow, according to some embodiments.

FIG. 9 is a dial angle estimation processing flow 900, according to some embodiments. Inputs to the dial angle estimation processing flow 900 include the rectified image 908 and a dial template 914. The rectified image 908 may include an image rectified using feature detection (operation 210 and operation 212 of FIG. 2) or template matching (operation 218 of FIG. 2). The dial template 914 may include an image of the dial itself from a template gauge, as the one or more template images 106 of FIG. 1 may include separate images for the gauge background and the dial.

The dial angle estimation processing flow 900 includes a for loop (defined using a for loop opening block 902 and a for loop closing block 904) is used to rotate the dial template 914 at 1-degree intervals using a template rotator 910. The dial angle estimation processing flow 900 applies a template matcher 912 to match the rotated version of the dial template 914 to the rectified image 908. A template match sorter 906 is used to identify one of the rotation angles as the one resulting in the greatest template matching coefficient between the rotated version of the dial template 914 and the rectified image 908 as determined by the template matcher 912. Accordingly, the dial angle estimation processing flow 900 determines an estimated dial angle 916, which may be provided as the result of operation 214 (estimating dial angle) of FIG. 2.

Figure 10:
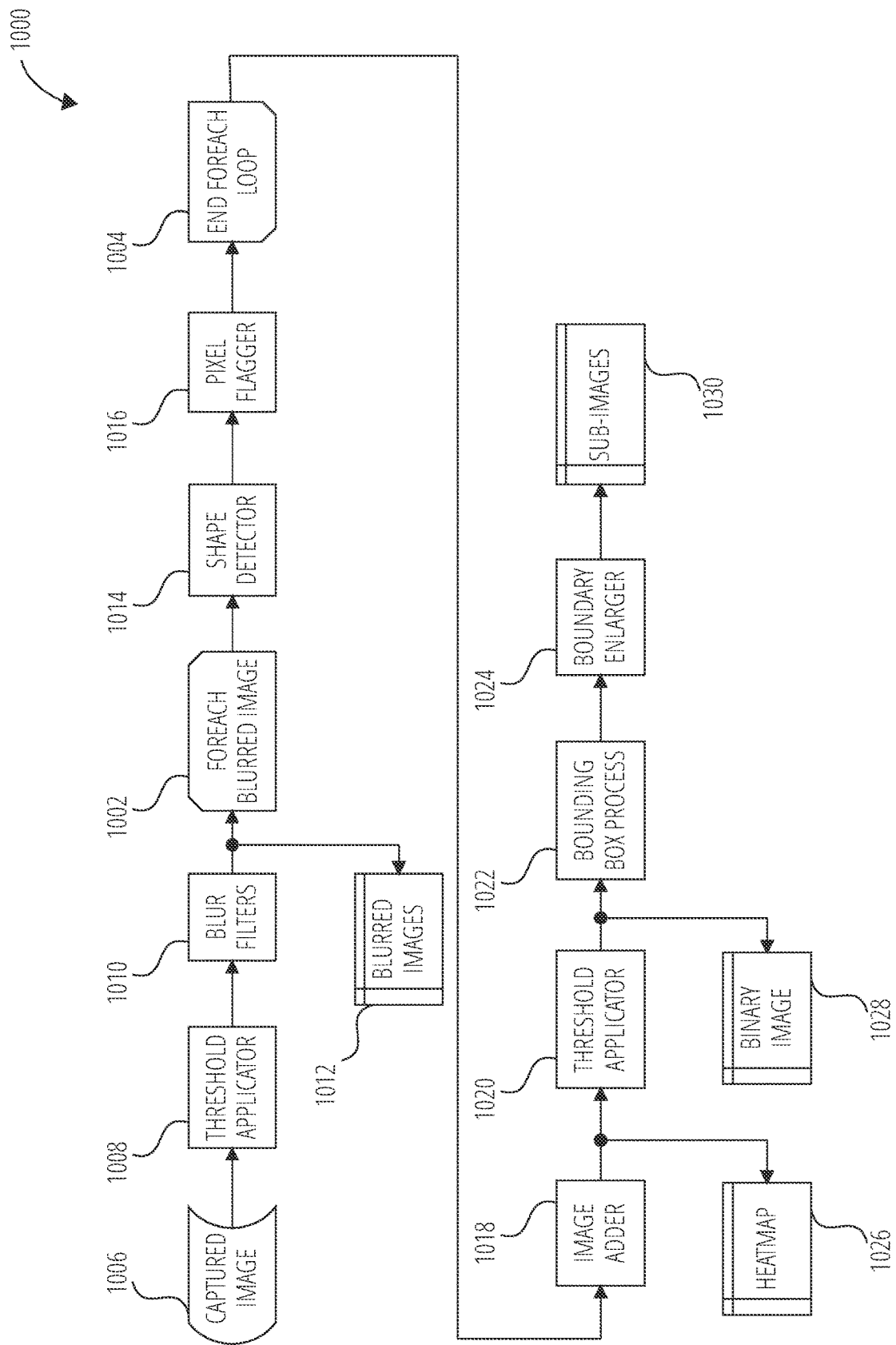
FIG. 10 is a gauge detection processing flow, according to some embodiments.

FIG. 10 is a gauge detection processing flow 1000, according to some embodiments. The input to the captured image 1006 may include a captured image 1006, which may be one of the one or more captured images 118 of FIG. 1. The captured image 1006 may picture one or more substantially circularly-faced gauges, which may be turned at any of various angles relative to the perspective of the image sensor (e.g., one of the one or more image sensors 108 of FIG. 1) used to capture the captured image 1006. By way of non-limiting example, some of the gauges in the captured image 1006 may appear substantially circular because the perspective of the image sensor used to capture the captured image 1006 may have been substantially perpendicular to the faces of the gauges. Also by way of non-limiting example, some of the gauges in the captured image 1006 may appear substantially elliptical because the perspective of the image sensor used to capture the captured image 1006 may have been oblique to the faces of the gauges. The gauge detection processing flow 1000 is configured to provide one or more sub-images 1030 of the captured image 1006, wherein each of the sub-images 1030 may include a cropped sub-image depicting a detected gauge. Accordingly, the gauge reading method 200 may be used to perform operation 204 (detecting one or more gauges in the captured image) and operation 206 (cropping a detected gauge to provide a use image) in the gauge reading method 200 of FIG. 2.

Conventional gauge reading technology does not have the ability to detect the location of multiple gauges contained within a single image. The gauge detection processing flow 1000 enables detection of gauges in an image and the resulting sub-images 1030 may be used in the gauge reading method 200 of FIG. 2 as use images. As a result, the gauge detection processing flow 1000 may take a captured image 1006 with multiple gauges of varying types, sizes, and colors, output a set of sub-images 1030 including the regions within the input image that may contain gauges that are readable by the gauge reading method 200 of FIG. 2.

By way of non-limiting example, the gauge detection processing flow 1000 may be implemented using Python and OpenCV as the basis of the algorithm. According to the gauge detection processing flow 1000, gauge faces are usually light colored and are almost always white with dark surroundings. Accordingly, it is possible to discern a gauge face from background by lightness. In addition, the gauge detection processing flow 1000 may be implemented for round-style gauges. These two key features, lightness and shape, can be used to determine if a region in a captured image 1006 is a gauge or not.

The gauge detection processing flow 1000 includes a threshold applicator 1008 configured to take the captured image 1006 and a brightness parameter value from 0 to 6 in increments of integers. This brightness parameter may be a brightness sensitivity controller that may be changed by the user based on the lightness of the gauge faces in contrast to the rest of the image. If the image background is dark, but the gauge face is light, then the user may input a high value. If the image background is near the same lightness as the gauge, the user may select a low value.

The captured image 1006 is processed so that high brightness areas in the image are emphasized. In this process, a binary threshold is applied to pixels as to set all low lightness pixels to 0 (black) while the remainder of the pixels remain at their original value. For instance, all pixels with a lightness value under 60 would be set to 0, while the remaining pixels would keep their original values ranged between 61 and 255 pixels. The desired outcome is a binary image where potential gauge faces have pixel values of 1 (white) and non-gauges have pixel values of 0 (black).

To set the regions of interest (ROI) to be white against a black background, the threshold applicator 1008 may apply thresholds on the lightness channel of the CIE LAB (L for the lightness, A from green to red, and B from blue to yellow) color space (Wikipedia contributors 2019) are applied. The LAB color space takes a normal red, green, blue (RGB) image and converts it to L, A, and B channels. The L channel is for lightness from black to white, the A channel is a spectrum from green to red, and the B channel is a spectrum from blue to yellow. Separating the lightness channel allows for a more accurate representation lightness and darkness than a simple RGB to grayscale conversion because it includes the luminance of colors on surfaces. By setting all pixel values below a given threshold to 0 (black) and all above the threshold to 1 (white), a binary image is formed. The threshold values are based on the user input brightness parameter and the normal distribution of the image pixel values.

In some embodiments the brightness parameter setting may be performed automatically. In some embodiments the brightness parameter may be set manually by a user. If a gauge is small relative to the background of the image, a low brightness parameter setting may e used, and if the gauge is large relative to the background of the image, a high brightness parameter setting may be used. This is because if the gauge takes up a small area of the image, the background will be significantly darker than the gauge face. This would mean that thresholding at brightness values greater than the mean would result in better isolation of the gauge face from the background than if the threshold was closer to the mean. The thresholds $\omega=[\omega_1, \omega_2, \omega_3, \omega_4]$ used are:

$$\omega_1 = \|+\sigma^*(-0.4+0.2^*\beta)$$

$$\omega_2 = \mu + \sigma^*(-0.2+0.2^*\beta)$$

$$\omega_3 = \mu + \sigma^*(0.2^*\beta)$$

$$\omega_4 = \nu + \sigma^*(0.2+0.2^*\beta),$$

where $\mu$ is the mean pixel brightness, $\sigma$ is the standard deviation of the pixel brightness, and $\beta$ is determined by the brightness parameter setting.

The gauge detection processing flow 1000 also includes blur filters 1010. The binary image provided by the threshold applicator 1008 may be provided to the blur filters 1010, which includes a series of filters at different kernel sizes. Since the ideal region of interest is a solid white circle at the same position as a gauge face, the blur filters 1010 may include a bilateral filter used to blur the internal dark pixels of the gauges (dark pixels in the gauges may be caused by text, ticks, the dial, etc.) while maintaining the outer edges of the gauges. The kernel size (processed area) used by the blur filters 1010 may be actively determined by an integer multiple of the standard kernel size calculated as follows:

$$S_i = \begin{cases} 15, & Y < 500 \\ \dfrac{i * Y}{100}, & Y \geq 500 \end{cases},$$

where $S_i$ is the standard kernel size, Y is the image length in the Y (vertical) axis, and i=1,2,3. This means that a large image may processed at the standard kernel size, two times the standard kernel size, and three times the standard kernel size for an output of three blurred images per threshold value (a total of 12 processed versions of the image), which are indicated in the gauge detection processing flow 1000 as blurred images 1012.

Figure 11:
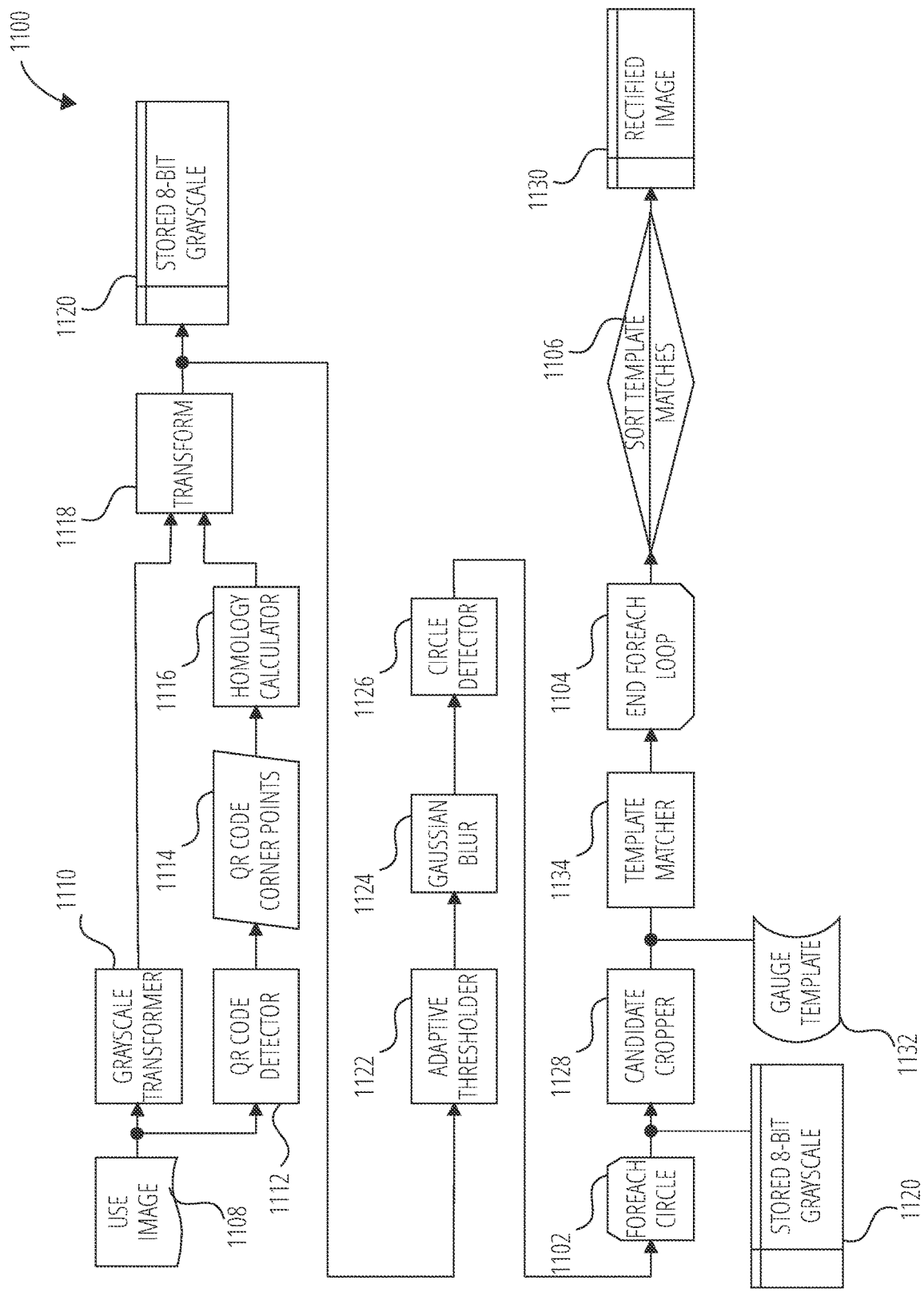
FIG. 11 is a QR-code rectification processing flow, according to some embodiments.

A foreach loop (indicated using a foreach loop opening block 1002 and a foreach loop closing block 1004 in FIG. 11) including a shape detector 1014 and a pixel flagger 1016 may be used to apply an elimination approach to each of the blurred images 1012, which are output by the blur filters 1010. Areas smaller than a certain size are "closed" (i.e., eliminated). The elimination occurs at the scales from the array of standard kernel sizes used by the blur filters 1010. Each of the blurred images 1012 is run through a the shape detector 1014, which may be similar to the contour detector 454, the contour size filter 412, the ellipse fitting 456 discussed with reference to the template matching rectification processing flow 400 of FIG. 4. For example, the shape detector 1014 may use contour detection to define closed regions of interest using circularity. The circularity measure is a metric that corresponds to the circularity of an elliptical shape. Circularity ranges from 0 to 1 where 0 is a straight line and 1 is a perfect circle (as discussed above with reference to FIG. 4). If these closed shapes estimated by the shape detector 1014 using contour detection are determined to be circular enough (e.g., have a major/minor axes ratio of less than 4, a circularity value of more than 0.5, and are similar enough to an ideal ellipse) to be determined a region of interest, then the area is flagged as a potential gauge. The areas corresponding to the gauge pixels are set to 21.25 (255 range/12 segments).

Once the shape detector 1014 has analyzed the contours by shape, the storage image contains areas with multiplication of 21.25 (a potential gauge) and other pixel values are 0 (not a potential gauge). Once a region's pixels are identified, the pixels are flagged as forbidden by the pixel flagger 1016. This will ensure the gauge detection processing flow 1000 will not analyze a shape with a center point within the boundaries of any of processed regions to avoid multiple redundant detections.

After each of the blurred images 1012 images are processed, and the potential gauge regions of interest are identified, the identified regions of interest are added cumulatively. The gauge detection processing flow 1000 includes an image adder 1018 configured to add the identified regions of each of the blurred images 1012 cumulatively. The result is an image, or heatmap 1026 illustrated in FIG. 10, of the same size as the original captured image 1006 with pixel values ranging from 0 to 255 in increments of 21.25 in this example as indicated earlier. The heatmap 1026 may be used to determine the likelihood of a region of interest being a gauge. A heatmap value of 255 indicates it is likely the area is a gauge, and a heatmap value of 0 means the area is likely background.

The captured image 1006 includes a threshold applicator 1020 configured to apply a threshold to the heatmap 1026 so that potential gauge areas that have been identified as gauges more than a threshold number N times or more may be determined to be gauges, and potential gauge areas that have been identified as gauges less than or equal to N types may be determined to not be gauges. By way of non-limiting example, N=3 may be selected. As a result, pixel values of the heatmap 1026 that are greater than 21.25*3=63.75 are set to a binary of one (indicating a gauge), and other pixels are set to zero (not a gauge). The result of the threshold applicator 1020 is a binary image 1028. The threshold value of N=3 was found to work well for some sample captured images, but a different value of threshold N may be used for different applications and use cases. By way of non-limiting example, an optimal threshold value N may be determined for a given set of conditions.

The gauge detection processing flow 1000 includes a bounding box process 1022 configured to process the binary image 1028 and the original captured image 1006. By way of non-limiting example, the bounding box process 1022 may use the OpenCV minAreaRect function, which fits a minimum area rotated rectangle to a given set of points by finding four corners that create the smallest area rectangle while still encompassing all the points (OpenCV Dev. Team 2019a). The regions determined to be gauges may have corner points assigned based on width and height. If the area covered is too small to be successfully processed by the gauge reading method 200 of FIG. 2, the area may not be considered a potential gauge. The minimum size may be arbitrary designed based on the application. By way of non-limiting example, a minimum size of 200 pixels in length may be chosen because an image of a gauge smaller than 200 pixels may not contain enough detail for feature detection of the gauge. If the gauge area is large enough (e.g., equal to or larger than the minimum size such as 200 pixels), the region is appended to a list (e.g., stored by the one or more data storage devices 104 of FIG. 1) that stores all regions to be processed as individual sub-images 1030.

As previously discussed, the bounding box process 1022 may use the corner points to determine the region of pixels that make up the sub-images containing only the region of interest. To ensure full detection of the gauge face, and to mitigate the potentially erosive effects of the thresholding, the gauge detection processing flow 1000 may include boundary enlarger 1024. The boundary enlarger 1024 is configured to enlarge the sub-images 1030 defined by the bounding box process 1022. By way of non-limiting example, the boundary enlarger 1024 may be configured to enlarge the sub-images 1030 by a factor of 1.3 in each direction. The sub-images 1030 output by the gauge detection processing flow 1000 may be used as use images in the gauge reading method 200 of FIG. 2.

The gauge detection processing flow 1000 was tested on multiple captured images. For each captured image the mean pixel value, standard deviation of brightness, approximate gauge face brightness, and number of identified gauges in the image were recorded. Seven possible brightness parameter values were used. The brightness parameter value, number of correct gauge detections, number of missed gauge detections, and total number of regions of interest found were also recorded. Each of the captured images used in the test had different brightness levels for the gauge faces. For example, for a brightness parameter value of 1, and an image with a mean pixel brightness value of 180 and standard deviation of 25, the image thresholds may be 175, 180, 185, and 190 representing 0.4 standard deviations below the mean, 0.2 standard deviations below the mean, the mean, and 0.2 standard deviations above the mean. As the brightness parameter setting increased, the brighter regions became more isolated (only the brightest regions were detected), and the average pixel value of the regions of interest increased as a result.

From this analysis, the percentage of missed gauge detections and percentage of erroneous detections was found. A missed gauge detection (missed positives) represents when the method failed to recognize a gauge successfully. An erroneous detection (false positive) represents when a gauge was detected, although a gauge did not exist. These performance values were defined using:

$$M = \frac{\mu}{\nu}$$

$$\varepsilon = \frac{\tau - \gamma}{\tau},$$

where M is the percentage of missed gauges, $\mu$ is the number of missed gauges, $\nu$ is the number of gauges in the original image, $\varepsilon$ is the percentage of erroneous gauge detection, $\tau$ is the total number of ROIs detected, and $\gamma$ is the number of gauges successfully detected. An ideal result of M=0% and $\varepsilon$=0% is desired, which means that the gauge detection processing flow 1000 detected every readable gauge and did not detect any non-gauge area as a gauge.

In a specific non-limiting example of a captured image 1006, properties of the captured image 1006 may be summarized as: mean pixel value=91; standard deviation of brightness=48; approximated gauge face brightness=125; and number of gauges in original image=23. To automate the brightness parameter selection process, a method was developed by finding the low brightness value of the gauge face through inspection. The potential best brightness parameter setting for the image may be calculated using:

$$T = \frac{\lambda - \mu}{\sigma} = \frac{(125 - 91.48)}{47.75} = 0.71,$$

where T is the ideal initial threshold value, $\lambda$ is the approximate gauge face value, $\mu$ is the mean pixel value in the image, and $\sigma$ is the standard deviation of pixel values in the image. Ideally, there would only need to be one threshold point slightly under this value so that only the pixels with brightness near that of the gauges would be shown. The 0.71 standard deviations correspond to brightness parameter between 5 and 6, with 6 being the nearest. The best performing brightness parameter settings from the test are indeed 5 and 6 setting at 30.43% missed and 46.67% erroneous detection or false positives. The gauges at extremely oblique angles in the captured image 1006 caused this. These images would have been unreadable by a human and were also unreadable by the gauge reading method 200 of FIG. 2.

One difficulty of the gauge detection processing flow 1000 is the difficulty to distinguish gauges from other bright spots and glare. In some cases the gauge detection processing flow 1000 flags areas that are difficult or impossible to box as regions of interest. Whether the resulting sub-images 1030 are unreadable due to blur or extreme angles to the camera, run time may be wasted while processing such sub-images 1030. Modifying the parameters of the shape detector 1014 may result in the mitigation of this issue, but further parameters should be explored to ensure that only sub-images 1030 corresponding to readable gauges are processed as use images in the gauge reading method 200 of FIG. 2. Though there are concerns relating to incorrect detection of regions of interest, further feature detection may be run on each individual region to determine if the region is what is desired (e.g., a gauge) or not before the final process (e.g., processing of the sub-images 1030 as use images using the gauge reading method 200 of FIG. 2) is run on the sub-images 1030. For example, potential regions of interest may be determined based on brightness and shape, each region of interest may be processed using feature detection to determine if the region of interest contains the desired features (e.g., features of a gauge), and other desired tasks may be performed on the sub-images 1030 from the region of interest.

FIG. 11 is a QR code rectification processing flow 1100, according to some embodiments. In some instances a QR code may be positioned proximate to a gauge to enable electronic determination of properties of a gauge (e.g., an identification of the gauge, maximum and minimum gauge values, maximum and minimum gauge angles, etc.) responsive to the QR code. Since QR codes have a substantially square shape, image rectification may be performed based on rectifying the shape of the QR code to a square in addition to, or instead of, based on rectifying the shape of the gauge to a circle. QR code rectification may assume that the QR code and the gauge's face are parallel with each other in the image. The QR code rectification processing flow 1100 may also be applied to other information conveying features such as a barcode. The QR code rectification processing flow 1100 may further be applied to any known shape parallel to the face of the gauge. By way of non-limiting example, a white sticker of known shape (e.g., a square a rectangle or other shape) may be placed proximate to the gauge, and parallel to the face of the gauge.

Inputs to the QR code rectification processing flow 1100 may include a use image 1108 including an image of a detected gauge (e.g., a sub-image of one of the one or more captured images 118 of FIG. 1). The use image 1108 may also include an image of a corresponding QR code proximate to the image of the gauge. A use image 310 of a gauge at an oblique angle may be rectified from a QR Code that is on a parallel plane to the gauge's face. By assuming that the QR Code is square, it may be possible to determine the homography and rectify the image.

The QR code rectification processing flow 1100 includes a grayscale transformer 1110 configured to transform the use image 1108 configured to convert he use image 1108 into a grayscale image. In parallel with the grayscale transformer 1110 the QR code rectification processing flow 1100 includes a QR code detector 1112 configured to detect the QR code in the use image 1108, a QR code corner points detector 1114 configured to detect QR code corner points, and a homology calculator 1116 configured to calculate a homology for transforming the grayscale version of the use image 1108. By way of non-limiting example, the QR code detector 1112 may use a library (e.g., OpenCV; BoofCV, Pyzbar) to detect a QR Code in the use image 1108. The homology calculator 1116 may use QR code corner point information provided by the QR code corner points detector 1114 to determine the homology for transforming the grayscale version of the use image 1108. The homology calculator 1116 may provide the homology to a transformer 1118 of the QR code rectification processing flow 1100 to rectify the greyscale version of the use image 1108 (provided by the grayscale transformer 1110) to generate and store a rectified grayscale image (stored 8-bit grayscale 1120).

Since at operation 1108 the use image is rectified, in some embodiments the QR code rectification processing flow 1100 may optionally end. After rectifying the use image 1108, however, the QR code rectification processing flow 1100 may optionally continue. For example, a Gaussian blur 1124 and an adaptive thresholder 444 are applied to the stored 8-bit grayscale 1120. A circle detector 1126 is used to find the gauge's face. The circle's characteristics (e.g., location, radius) are used to create a cropped copy of the rectified grayscale image and the best candidate out of circles detected by the circle detector 1126 is selected by template matching with the background template of the gauge. The template matching is applied using a foreach loop (indicated in the QR code rectification processing flow 1100 using a foreach loop opening block 1102 and a foreach loop closing block 1104) that applies a candidate cropper 1128 and a template matcher 1134 for each circle detected by the circle detector 1126. The template matches identified by the template matcher 1134 may be sorted by a sort template matches 1106, and the best candidate (e.g., determined by the highest correlation between a circle candidate determined by the circle detector 1126 and a gauge template 1132 including an image of the template gauge) is selected to be the rectified image 1130. The rectified image 1130 may be used in a modified version of the gauge reading method 200 of FIG. 2 (e.g., the QR code rectification processing flow 1100 may replace the operation 210, the operation 212, and the operation 218 of the gauge reading method 200 of FIG. 2 and the rectified image 1130 may be provided to operation 214 and operation 220 of the gauge reading method 200 of FIG. 2).

In conjunction with the QR code rectification processing flow 1100, the QR Code would also convey information about the gauge. This information would allow the appropriate background image and dial templates to be loaded and allow for information to be looked up regarding the gauge's minimum and maximum angles, as well as the gauge's minimum and maximum values. Specific instrument tag information could also be stored in the QR Code to validate that an operator is reading the correct gauge. This approach may, however, require plants to retrofit existing gauges with QR Code tags. Where such retrofitting with QR codes is unpractical or undesirable, however, the gauge reading method 200 of FIG. 2 employing feature detection by default and template matching as a fallback may be used rather than the QR code rectification processing flow 1100.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventors.

What is claimed is:

1. A gauge reading system, comprising:
one or more processors; and
one or more data storage devices including one or more template images of one or more template gauges stored thereon, the one or more data storage devices further including computer-readable instructions stored thereon, the computer-readable instructions configured to instruct the one or more processors to:
classify a detected gauge in a use image to correlate the detected gauge with one of the one or more template images;
attempt to perform feature detection on the use image based on the correlated one of the one or more template images to transform the use image into a rectified image;
perform template matching rectification on the use image to produce the rectified image responsive to a failure to perform the feature detection; and
estimate a gauge reading of the detected gauge responsive to the rectified image.

2. The gauge reading system of claim 1, wherein the computer-readable instructions are further configured to instruct the one or more processors to detect the detected gauge in a captured image.

3. The gauge reading system of claim 2, wherein the computer-readable instructions are further configured to instruct the one or more processors to detect a plurality of gauges in the captured image and provide a plurality of sub-images, each of the plurality of sub-images including one of the detected plurality of gauges.

4. The gauge reading system of claim 3, wherein the computer-readable instructions are configured to instruct the one or more processors to detect the plurality of gauges by detecting substantially rounded regions of lightness surrounded by darkness in the captured image.

5. The gauge reading system of claim 3, wherein the computer-readable instructions are configured to instruct the one or more processors to detect the plurality of gauges by applying one or more binary thresholds to pixels of the captured image to generate a binary image.

6. The gauge reading system of claim 1, wherein the computer-readable instructions are configured to instruct the one or more processors to perform the template matching rectification by blurring the use image and generating binary threshold images based on the blurred use image.

7. The gauge reading system of claim 6, wherein the computer-readable instructions are further configured to instruct the one or more processors to detect contours in the binary threshold images, fit ellipses to the detected contours, and determine a homology estimation to rectify the use image based on the fit of the ellipses to the detected contours.

8. The gauge reading system of claim 1, wherein the computer-readable instructions are further configured to instruct the one or more processors to estimate the gauge reading by:
estimating a gauge angle of the detected gauge in the rectified image relative to a template angle of a template gauge in the correlated one of the one or more template images; and
estimating a dial angle of a dial of the detected gauge in the rectified image relative to the detected gauge in the rectified image.

9. The gauge reading system of claim 8, wherein the computer-readable instructions are configured to instruct the one or more processors to estimate the gauge angle by rotating the rectified image by a plurality of different angles and examine a match of the rectified image for each of the plurality of different angles to the correlated one of the one or more template images.

10. The gauge reading system of claim 8, wherein the computer-readable instructions are configured to instruct the one or more processors to estimate the dial angle by rotating a template image of the dial by a plurality of different angles and examine a match of the rectified image to the template image of the dial at the plurality of different angles.

11. The gauge reading system of claim 1, further comprising an image sensor configured to provide image data corresponding to a captured image, the use image taken from the captured image.

12. The gauge reading system of claim 11, further comprising a drone configured to carry the image sensor.

13. The gauge reading system of claim 11, wherein the image sensor includes one or more of a panoramic camera, a surveillance camera, a still camera, and a video camera.

14. A gauge reading method, comprising:
capturing image data corresponding to a captured image of one or more gauges;
detecting one or more gauges in the captured image;
cropping a detected gauge in the captured image to provide a use image including the detected gauge;
classifying the detected gauge to correlate the detected gauge with a template image;
attempting to perform feature detection rectification on the use image to produce a rectified image of the detected gauge;
performing template matching rectification on the use image to produce the rectified image responsive to a failure to perform the feature detection rectification; and
estimating a gauge reading responsive to the rectified image.

15. The gauge reading method of claim 14, wherein:
capturing the image data comprises capturing the image data from an angle that is oblique to faces of the one or more gauges; and
performing rectification on the use image comprises resolving a perceived substantially oval shape of a face of the detected gauge in the use image to a substantially circular face in the rectified image.

16. The gauge reading method of claim 14, wherein detecting the one or more gauges in the captured image comprises:
applying one or more thresholds to the captured image;
blurring the thresholded captured image to generate a plurality of blurred images;
detecting rounded shapes in each of the blurred images;
adding each of the blurred images together to produce a heatmap; and
applying a threshold to the heatmap to produce a binary image including those of the detected rounded shapes detected in a threshold number or greater of the blurred images.

17. The gauge reading method of claim 16, wherein cropping the detected gauge in the captured image to provide the use image includes;
bounding the detected rounded shapes in the binary image into rectangular regions; and
providing sub-images of the captured image corresponding to the rectangular regions of the binary image, the use image including one of the sub-images.

18. The gauge reading method of claim 14, wherein attempting to perform the feature detection rectification on the use image includes determining that the feature detection rectification failed responsive to a determination that fewer than a predetermined number of features of the use image match features of the template image.

19. The gauge reading method of claim 14, wherein performing the template matching rectification on the use image includes:
blurring at least one of a saturation and a value of the use image;
thresholding the blurred use image according to one or more thresholds to provide one or more binary threshold images;
detecting contours in the one or more binary threshold images;
fitting ellipses to the detected contours in the one or more binary threshold images; and
rectifying the use image based on the fit of the ellipses to the detected contours in the one or more binary threshold images to provide the rectified image.

20. The gauge reading method of claim 14, wherein estimating the gauge reading responsive to the rectified image comprises:
estimating a gauge angle of the detected gauge relative to a template gauge of the template image; and
estimating a dial angle of a dial of the detected gauge relative to the detected gauge.

21. The gauge reading method of claim 14, wherein classifying the detected gauge to correlate the detected gauge with the template image includes computing a correlation between the use image and a plurality of template images and selecting the template image of the plurality of template images responsive to the template image having a highest computed correlation with the use image.

22. The gauge reading method of claim 14, wherein capturing the image data comprises capturing the image data with one or more of a panoramic camera, a surveillance camera, a still camera, and a video camera.

23. A gauge reading method, comprising:
   detecting a known shape in a use image illustrating a gauge and the known shape with the known shape parallel with a face of the gauge;
   detecting corner points of the known shape;
   generating a transformation matrix for rectifying the use image based on the detected corner points of the known shape;
   transforming the use image responsive to the transformation matrix to provide a transformed image;
   detecting one or more circles in the transformed image;
   matching a template gauge image to each of the one or more detected circles; and
   providing a rectified image including a matched one of the one or more detected circles.

24. The gauge reading method of claim 23, wherein the known shape is coplanar with the face of the gauge.

25. The gauge reading method of claim 23, further comprising capturing, with one or more image sensors, a captured image, the use image taken from the captured image.

26. The gauge reading method of claim 25, wherein capturing a captured image comprises capturing the captured image with an image sensor carried by a drone.

27. The gauge reading method of claim 23, wherein detecting the known shape comprises detecting a quick response (QR) code.

28. The gauge reading method of claim 23, wherein detecting the known shape comprises detecting a bar code.

* * * * *